(12) United States Patent
Wang

(10) Patent No.: US 12,468,120 B2
(45) Date of Patent: Nov. 11, 2025

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Li-Kai Wang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 746 days.

(21) Appl. No.: 17/834,991

(22) Filed: Jun. 8, 2022

(65) Prior Publication Data

US 2023/0020801 A1    Jan. 19, 2023

(30) Foreign Application Priority Data

Jul. 5, 2021 (CN) .......................... 202110759874.5
Sep. 7, 2021 (TW) ................................ 110133222

(51) Int. Cl.
 *G02B 9/62* (2006.01)
 *G02B 13/18* (2006.01)

(52) U.S. Cl.
 CPC .............. *G02B 9/62* (2013.01); *G02B 13/18* (2013.01)

(58) Field of Classification Search
 CPC ........ G02B 9/62; G02B 9/64; G02B 13/0045; G02B 13/0015; G02B 13/16; G02B 13/18; G02B 27/0025; G02B 27/0012; G02B 27/0172; H04N 5/222; H04N 5/2254

USPC ......... 359/656–658, 708, 713, 719, 756–762
See application file for complete search history.

(56) References Cited

U.S. PATENT DOCUMENTS

| | | | |
|---|---|---|---|
| 10,054,791 B2 | 8/2018 | Mori | |
| 10,901,185 B2 | 1/2021 | Zhang et al. | |
| 11,719,912 B2* | 8/2023 | Song ........................ | G02B 9/62 359/713 |
| 2016/0085054 A1* | 3/2016 | Asami ...................... | G02B 9/64 359/755 |
| 2018/0314054 A1* | 11/2018 | Takato ................... | G02B 23/26 |
| 2021/0080698 A1 | 3/2021 | Chen | |

FOREIGN PATENT DOCUMENTS

| | | |
|---|---|---|
| CN | 107664826 A | 2/2018 |
| CN | 108535834 A | 9/2018 |
| CN | 108873245 A | 11/2018 |
| CN | 111175940 A | 5/2020 |
| CN | 113156611 A | 7/2021 |

(Continued)

*Primary Examiner* — Travis S Fissel
(74) *Attorney, Agent, or Firm* — McClure, Qualey & Rodack, LLP

(57) ABSTRACT

A wide-angle lens assembly, including a first lens, a second lens, a third lens, a fourth lens, a fifth lens, and a sixth lens, satisfies:  $5.2 \leq (CT1+CT2)/CT4 \leq 7.7$;  $1 \leq |R61/R52| \leq 5$; wherein CT1 is an interval from an object side surface of the first lens to an image side surface of the first lens along an optical axis, CT2 is an interval from an object side surface of the second lens to an image side surface of the second lens along the optical axis, CT4 is an interval from an object side surface of the fourth lens to an image side surface of the fourth lens along the optical axis, R61 is a radius of curvature of an object side surface of the sixth lens, and R52 is a radius of curvature of an image side surface of the fifth lens.

18 Claims, 30 Drawing Sheets

(56) References Cited

FOREIGN PATENT DOCUMENTS

| | | |
|---|---|---|
| JP | 2020109513 A | 7/2020 |
| TW | M359701 U | 6/2009 |
| TW | 201641988 A | 12/2016 |
| TW | 201708874 A | 3/2017 |
| TW | 201743100 A | 12/2017 |

\* cited by examiner

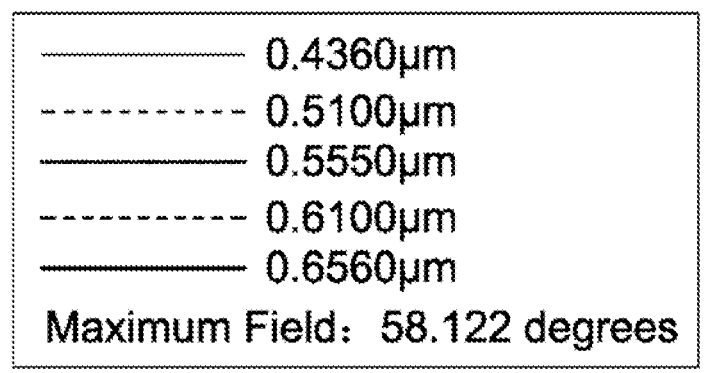
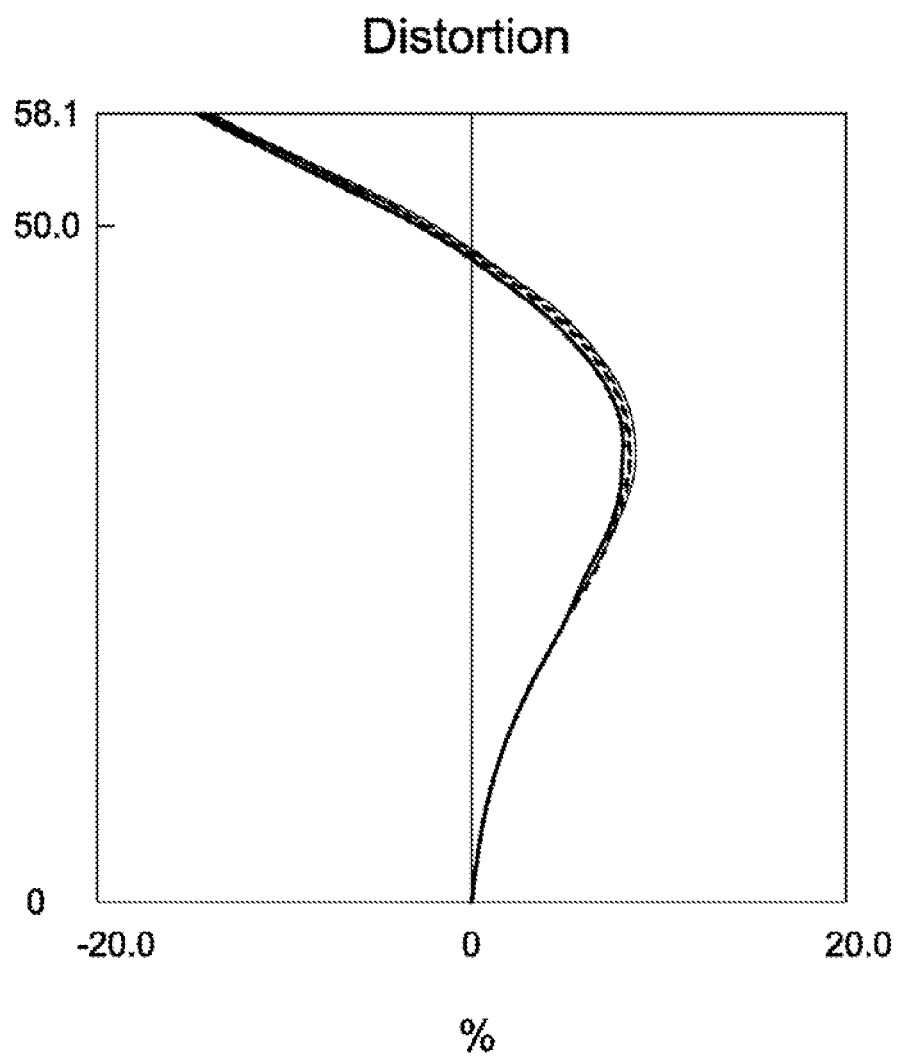
Fig. 2C

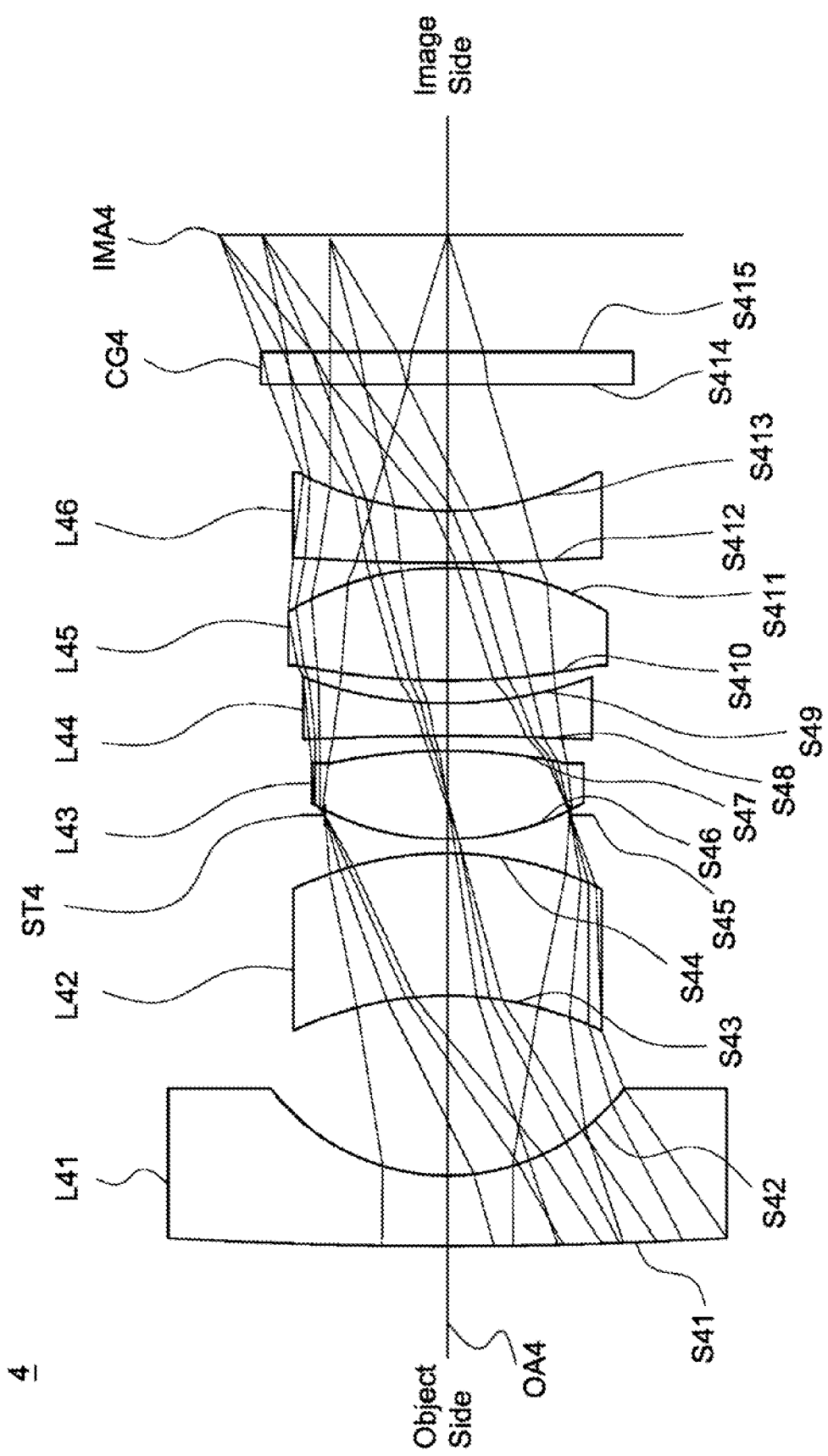

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward large field of view. Additionally, the wide-angle lens assembly is developed to have miniaturization, small F-number, and high resolution capability in accordance with different application requirements. However, the known wide-angle lens assembly can't satisfy such requirements. Therefore, the wide-angle lens assembly needs a new structure in order to meet the requirements of large field of view, miniaturization, small F-number, and high resolution at the same time.

BRIEF SUMMARY OF THE INVENTION

The invention provides a wide-angle lens assembly to solve the above problems. The wide-angle lens assembly of the invention is provided with characteristics of an increased field of view, a shortened total lens length, a decreased F-number, an increased resolution, and still has a good optical performance.

The wide-angle lens assembly in accordance with an exemplary embodiment of the invention includes a first lens, a second lens, a third lens, a fourth lens, a fifth lens, and a sixth lens. The first lens is with negative refractive power. The second lens is with positive refractive power. The third lens is with positive refractive power. The fourth lens is with negative refractive power. The fifth lens is with positive refractive power and includes a convex surface facing an image side. The sixth lens is with refractive power. The first lens, the second lens, the third lens, the fourth lens, the fifth lens, and the sixth lens are arranged in order from an object side to the image side along an optical axis. An air gap is disposed between the fourth lens and the fifth lens. The wide-angle lens assembly satisfies: $5.2 \leq (CT1+CT2)/CT4 \leq 7.7$; $1 \leq |R61/R52| \leq 5$; wherein CT1 is an interval from an object side surface of the first lens to an image side surface of the first lens along the optical axis, CT2 is an interval from an object side surface of the second lens to an image side surface of the second lens along the optical axis, CT4 is an interval from an object side surface of the fourth lens to an image side surface of the fourth lens along the optical axis, R61 is a radius of curvature of an object side surface of the sixth lens, and R52 is a radius of curvature of an image side surface of the fifth lens.

In another exemplary embodiment, the first lens is a meniscus lens and includes a convex surface facing the object side and a concave surface facing the image side, the second lens is a meniscus lens and includes a concave surface facing the object side and a convex surface facing the image side, the third lens is a biconvex lens and includes a convex surface facing the object side and another convex surface facing the image side, the fourth lens includes a concave surface facing the image side, the fifth lens is a biconvex lens and further includes a convex surface facing the object side, and the sixth lens is a meniscus lens.

In yet another exemplary embodiment, the fourth lens is a biconcave lens and further includes another concave surface facing the object side.

In another exemplary embodiment, the wide-angle lens assembly satisfies at least one of the following conditions: $0.6 < |R11/R41| < 2.4$; $4 < R21/(R12+R22) < 13.5$; $9.9 < R42/CT4 < 103$; $1.3 < R51/(f2-CT5) < 3.5$; $4 \text{ mm} < f2/(CT2-CT6) < 8.2 \text{ mm}$; $5 \text{ mm} < |R61/Nd1| < 15 \text{ mm}$; $11 \text{ mm} < |R41-f2| < 25 \text{ mm}$; $-13 < (R42+R41)/R32 < 0.3$; $3.3 \text{ mm} < R42/(Vd3/Vd4) < 30 \text{ mm}$; $-3.2 < f1/(R41+f5) < 2.3$; $4 \leq (Vd5/Vd6) - R22 \leq 12$; wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

In yet another exemplary embodiment, the sixth lens is with positive refractive power and includes a concave surface facing the object side and a convex surface facing the image side.

In another exemplary embodiment, the fourth lens is a meniscus lens and further includes a convex surface facing the object side.

In yet another exemplary embodiment, the wide-angle lens assembly satisfies at least one of the following conditions: $25 \text{ mm} \leq R11/Nd2 \leq 50 \text{ mm}$; $1.5 \text{ mm}^2 \leq f3 \times (CT1+CT2) \leq 3.5 \text{ mm}^2$; $13 \text{ mm} \leq (R32)^2/CT4 \leq 23 \text{ mm}$; $5 \text{ mm}^{-2} \leq (Vd1/R51)/f3 \leq 8.5 \text{ mm}^{-2}$; $2 \leq (R62/Nd6)/CT4 \leq 6.5$; $5 \text{ mm}^2 \leq (f4/(R52/R32))^2 \leq 21 \text{ mm}^2$; $2 \text{ mm} \leq (f6)^2/R61 \leq 7 \text{ mm}$; $-3.2 < f1/(R41+f5) < 2.3$; $4 \leq (Vd5/Vd6) - R22 \leq 12$; wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

In another exemplary embodiment, the sixth lens is with negative refractive power and includes a convex surface facing the object side and a concave surface facing the image side.

In yet another exemplary embodiment, the wide-angle lens assembly further includes a stop disposed between the second lens and the third lens.

In another exemplary embodiment, the fourth lens includes a concave surface facing the object side, the wide-angle lens assembly satisfies at least one of the following conditions: $0.6<|R11/R41|<2.4$; $4<R21/(R12+R22)<13.5$; $9.9<R42/CT4<103$; $1.3<R51/(f2-CT5)<3.5$; $4\text{ mm}<f2/(CT2-CT6)<8.2\text{ mm}$; $5\text{ mm}<|R61/Nd1|<15\text{ mm}$; $11\text{ mm}<R41-f2<25\text{ mm}$; $-13<(R42+R41)/R32<0.3$; $3.3\text{ mm}<R42/(Vd3/Vd4)<30\text{ mm}$; $-3.2<f1/(R41+f5)<2.3$; $4\leq(Vd5/Vd6)-R22\leq12$; wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

In yet another exemplary embodiment, the sixth lens is with positive refractive power, the wide-angle lens assembly satisfies at least one of the following conditions: $0.6<|R11/R41|<2.4$; $4<R21/(R12+R22)<13.5$; $9.9<R42/CT4<103$; $1.3<R51/(f2-CT5)<3.5$; $4\text{ mm}<f2/(CT2-CT6)<8.2\text{ mm}$; $5\text{ mm}<R61/Nd1<15\text{ mm}$; $11\text{ mm}<|R41-f2|<25\text{ mm}$; $-13<(R42+R41)/R32<0.3$; $3.3\text{ mm}<R42/(Vd3/Vd4)<30\text{ mm}$; $-3.2<f1/(R41+f5)<2.3$; $4\leq(Vd5/Vd6)-R22\leq12$; wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

In another exemplary embodiment, the first lens is a meniscus lens and includes a convex surface facing the object side and a concave surface facing the image side, the second lens is a meniscus lens and includes a concave surface facing the object side and a convex surface facing the image side, the third lens is a biconvex lens and includes a convex surface facing the object side and another convex surface facing the image side, the fourth lens includes a concave surface facing the image side, the fifth lens is a biconvex lens and further includes a convex surface facing the object side, and the sixth lens is a meniscus lens and includes a concave surface facing the object side and a convex surface facing the image side.

In yet another exemplary embodiment, the fourth lens includes a convex surface facing the object side, the wide-angle lens assembly satisfies at least one of the following conditions: $25\text{ mm}\leq R11/Nd2\leq50\text{ mm}$; $1.5\text{ mm}^2\leq f3\times(CT1+CT2)\leq3.5\text{ mm}^2$; $13\text{ mm}\leq(R32)^2/CT4\leq23\text{ mm}$; $5\text{ mm}^{-2}\leq(Vd1/R51)/f3\leq8.5\text{ mm}^{-2}$; $2\leq(R62/Nd6)/CT4\leq6.5$; $5\text{ mm}^2\leq(f4/(R52/R32))^2\leq21\text{ mm}^2$; $2\text{ mm}\leq(f6)^2/R61\leq7\text{ mm}$; $-3.2\leq f1/(R41+f5)<2.3$; $4\leq(Vd5/Vd6)-R22\leq12$; wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

In another exemplary embodiment, the sixth lens is with negative refractive power, the wide-angle lens assembly satisfies at least one of the following conditions: $25\text{ mm}\leq R11/Nd2\leq50\text{ mm}$; $1.5\text{ mm}^2\leq f3\times(CT1+CT2)\leq3.5\text{ mm}^2$; $13\text{ mm}\leq(R32)^2/CT4\leq23\text{ mm}$; $5\text{ mm}^{-2}\leq(Vd1/R51)/f3\leq8.5\text{ mm}^{-2}$; $2\leq(R62/Nd6)/CT4\leq6.5$; $5\text{ mm}^2\leq(f4/(R52/R32))^2\leq21\text{ mm}^2$; $2\text{ mm}\leq(f6)^2/R61\leq7\text{ mm}$; $-3.2\leq f1/(R41+f5)<2.3$; $4\leq(Vd5/Vd6)-R22\leq12$; wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

In yet another exemplary embodiment, the first lens is a meniscus lens and includes a convex surface facing the object side and a concave surface facing the image side, the second lens is a meniscus lens and includes a concave surface facing the object side and a convex surface facing the image side, the third lens is a biconvex lens and includes a convex surface facing the object side and another convex surface facing the image side, the fourth lens includes a concave surface facing the image side, the fifth lens is a biconvex lens and further includes a convex surface facing the object side, and the sixth lens is a meniscus lens and includes a convex surface facing the object side and a concave surface facing the image side.

In another exemplary embodiment, the wide-angle lens assembly satisfies at least one of the following conditions: −3.2<f1/(R41+f5)<2.3; 4≤(Vd5/Vd6)−R22≤12; wherein R22 is a radius of curvature of the image side surface of the second lens, R41 is a radius of curvature of the object side surface of the fourth lens, f1 is an effective focal length of the first lens, f5 is an effective focal length of the fifth lens, Vd5 is an Abbe number of the fifth lens, and Vd6 is an Abbe number of the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A, FIG. 2B, FIG. 2C, and FIG. 2D depict a longitudinal aberration diagram, a field curvature diagram, a distortion diagram, and a relative illumination of the wide-angle lens assembly in accordance with the first embodiment of the invention, respectively;

FIG. 7, FIG. 9, and FIG. 11 are lens layout and optical path diagrams of a wide-angle lens assembly in accordance with a fourth, a fifth, and a sixth embodiments of the invention, respectively;

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, and a sixth lens. The first lens is with negative refractive power. The second lens is with positive refractive power. The third lens is with positive refractive power. The fourth lens is with negative refractive power. The fifth lens is with positive refractive power and includes a convex surface facing an image side. The sixth lens is with refractive power. The first lens, the second lens, the third lens, the fourth lens, the fifth lens, and the sixth lens are arranged in order from an object side to the image side along an optical axis. An air gap is disposed between the fourth lens and the fifth lens. The wide-angle lens assembly satisfies: 1≤R61/R52I≤5; wherein R61 is a radius of curvature of an object side surface of the sixth lens and R52 is a radius of curvature of an image side surface of the fifth lens.

Referring to Table 1, Table 2, Table 4, Table 5, Table 7, and Table 8, wherein Table 1, Table 4, and Table 7 show optical specification in accordance with a first, second, and third embodiments of the invention, respectively and Table 2, Table 5, and Table 8 show aspheric coefficients of each aspheric lens in Table 1, Table 4, and Table 7, respectively.

Figure 1:
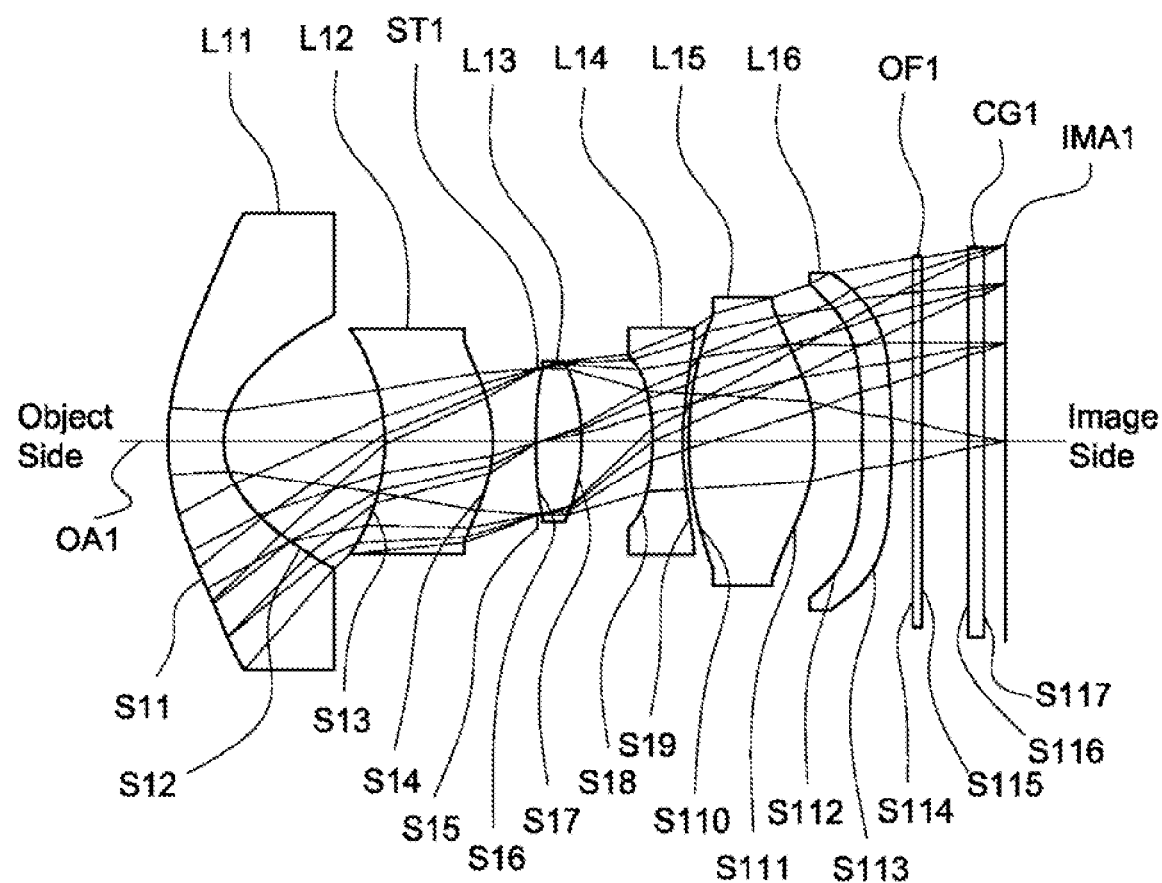
FIG. 1, FIG. 3, and FIG. 5 are lens layout and optical path diagrams of a wide-angle lens assembly in accordance with a first, a second, and a third embodiments of the invention, respectively.
Figure 2A:
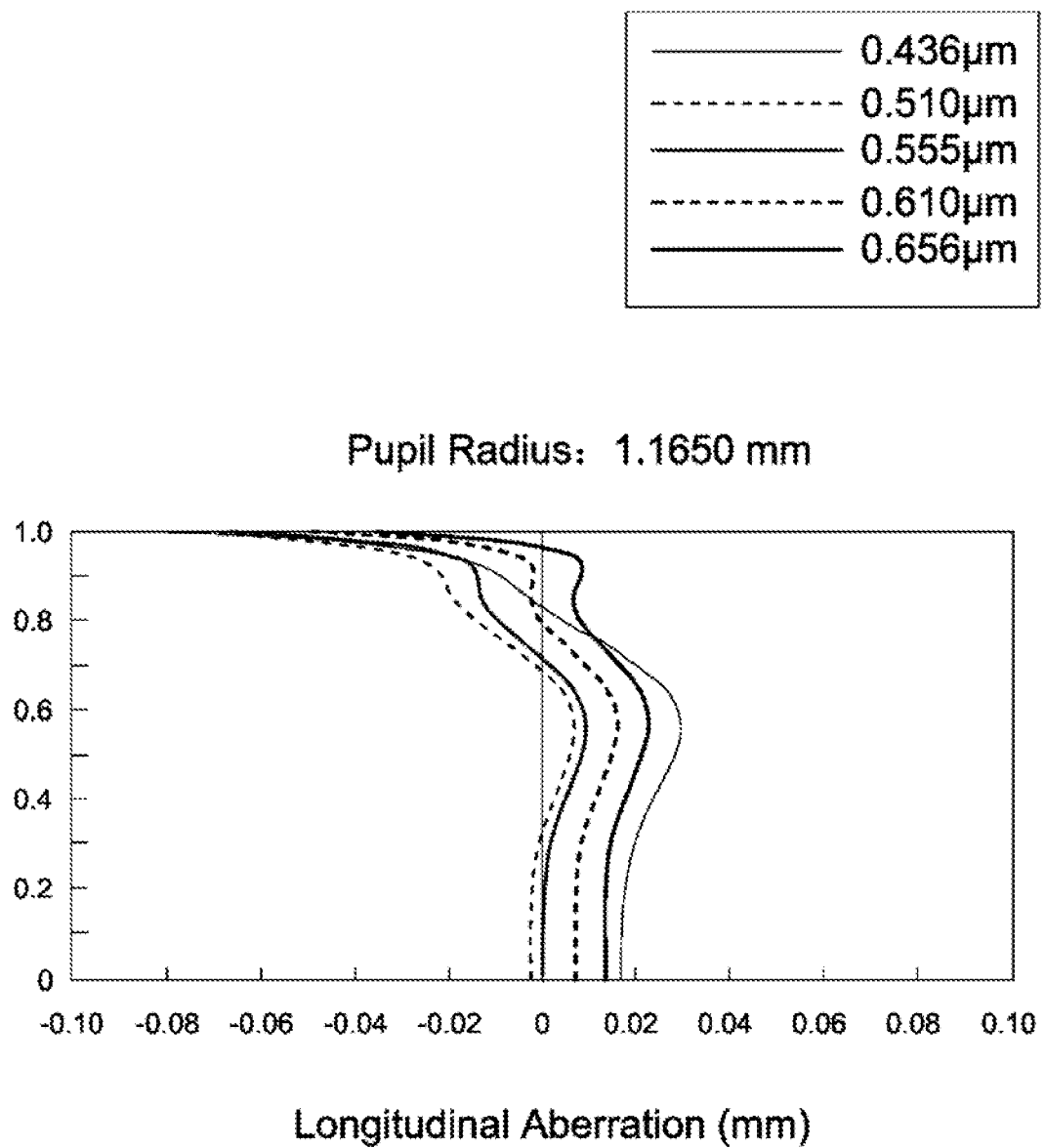
Figure 2B:
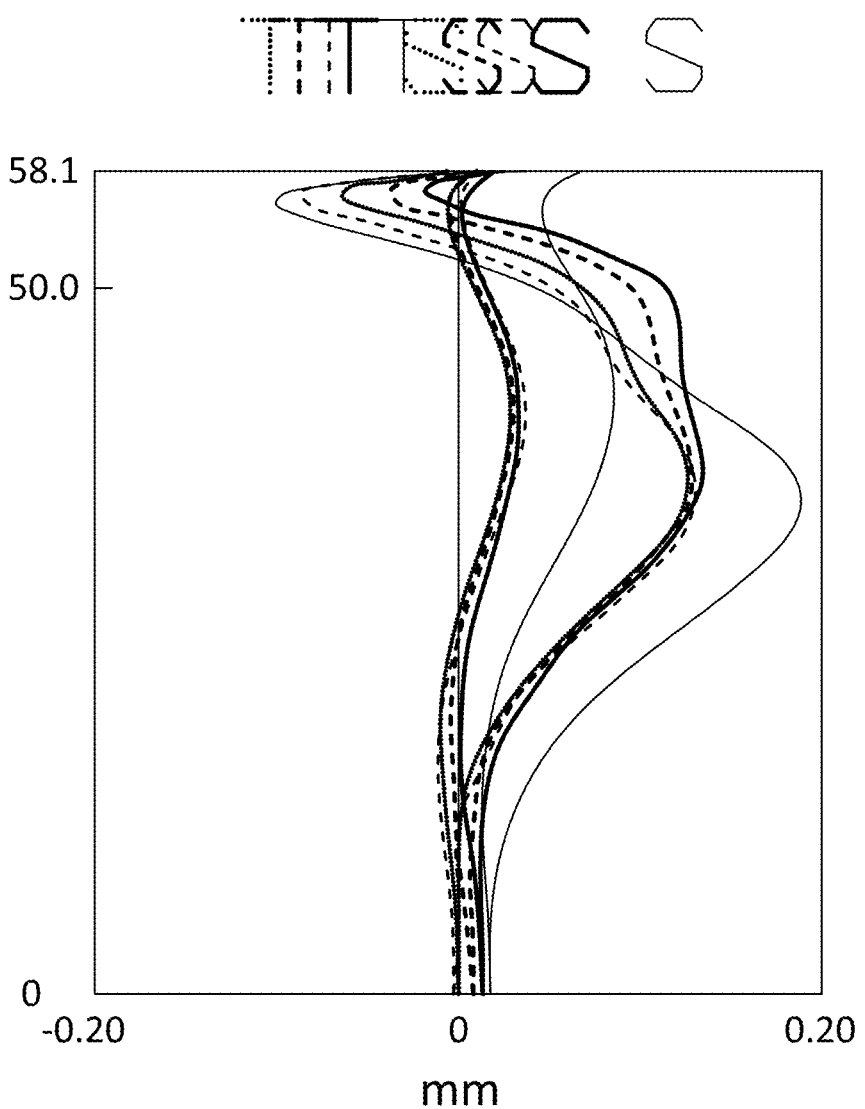
Figure 2D:
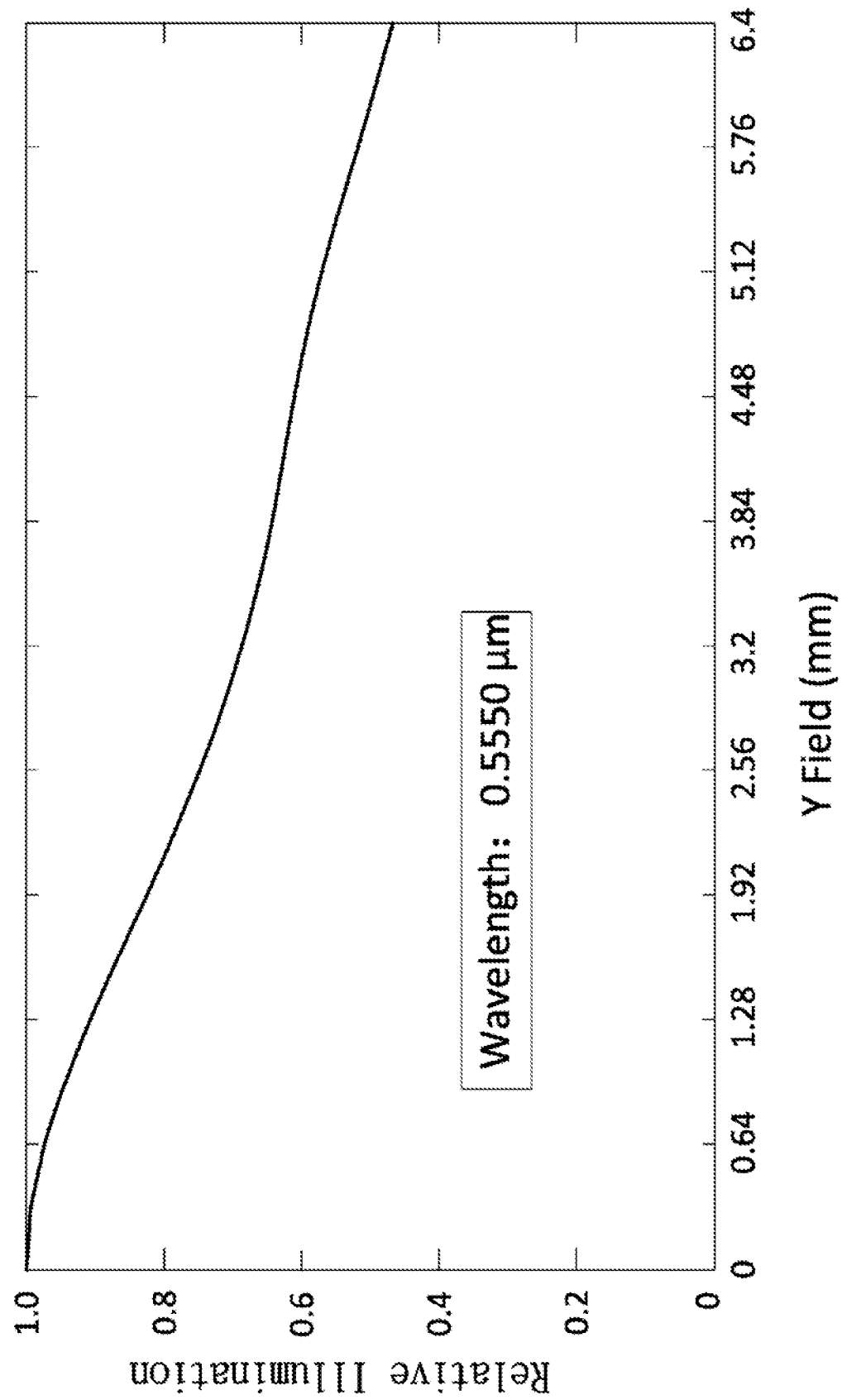
Figure 3:
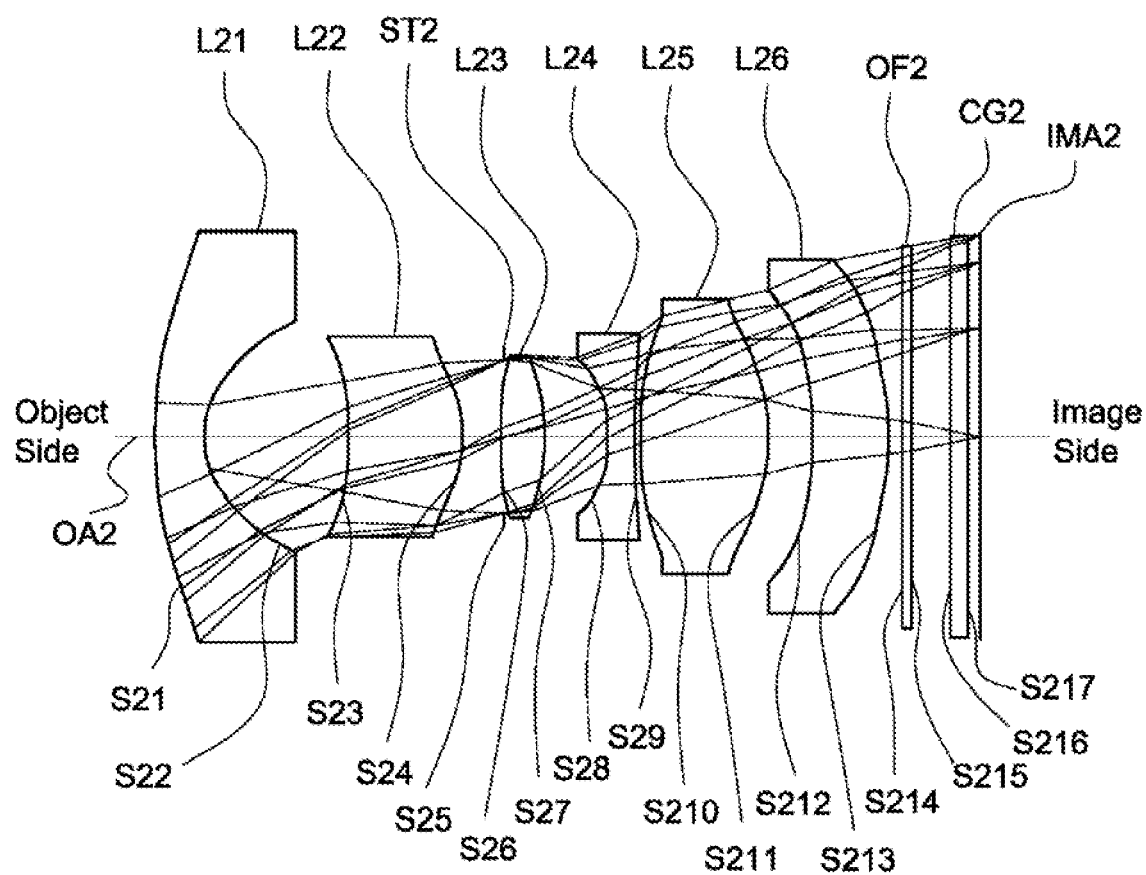
Figure 4A:
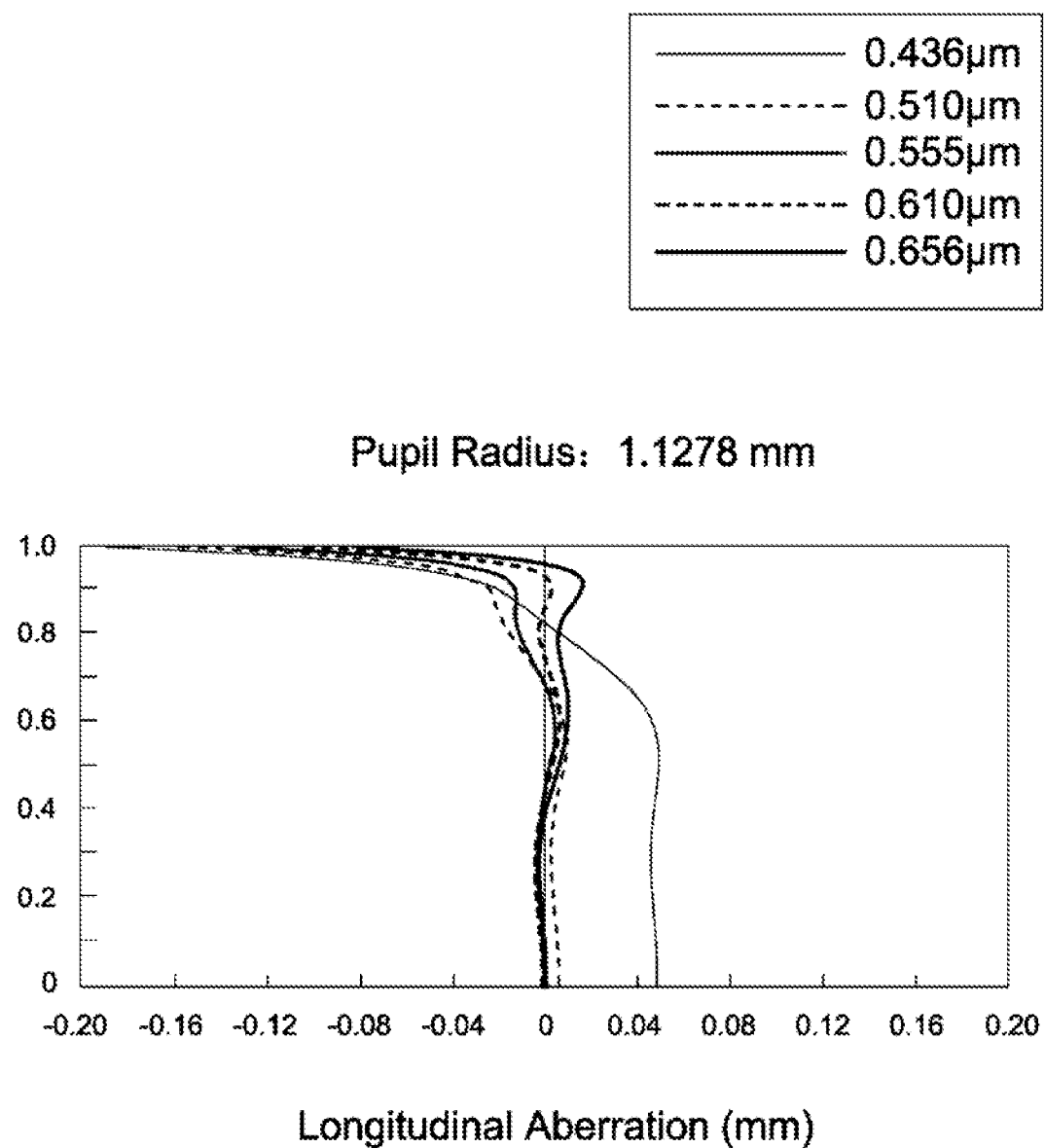
FIG. 4A, FIG. 4B, FIG. 4C, and FIG. 4D depict a longitudinal aberration diagram, a field curvature diagram, a distortion diagram, and a relative illumination of the wide-angle lens assembly in accordance with the second embodiment of the invention, respectively.
Figure 4B:
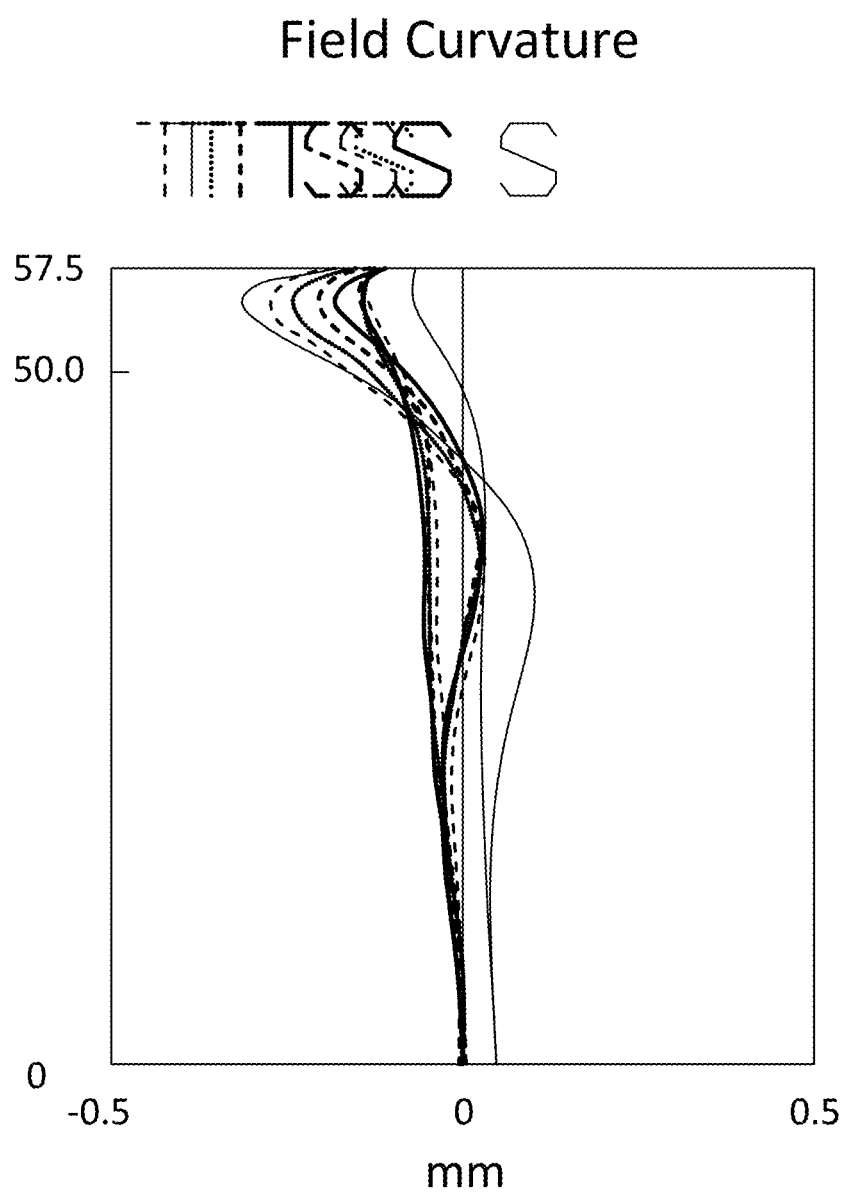
Figure 4C:
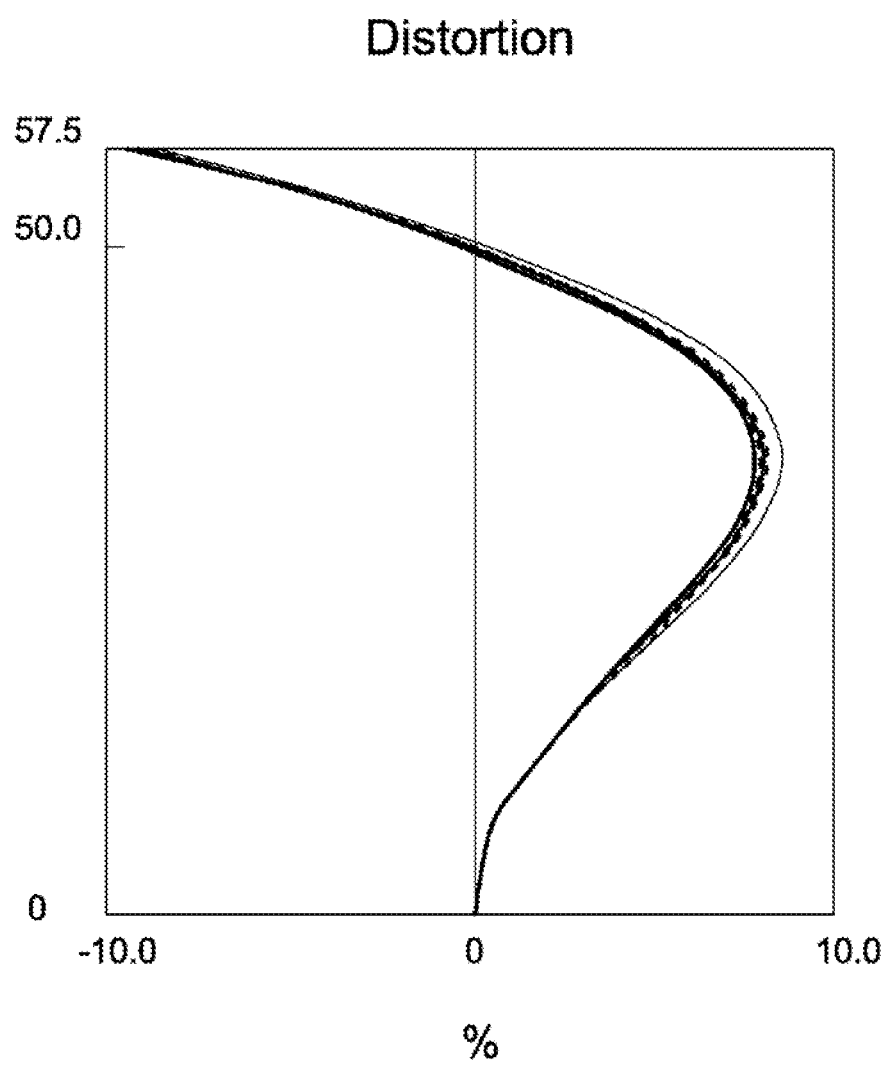
Figure 4D:
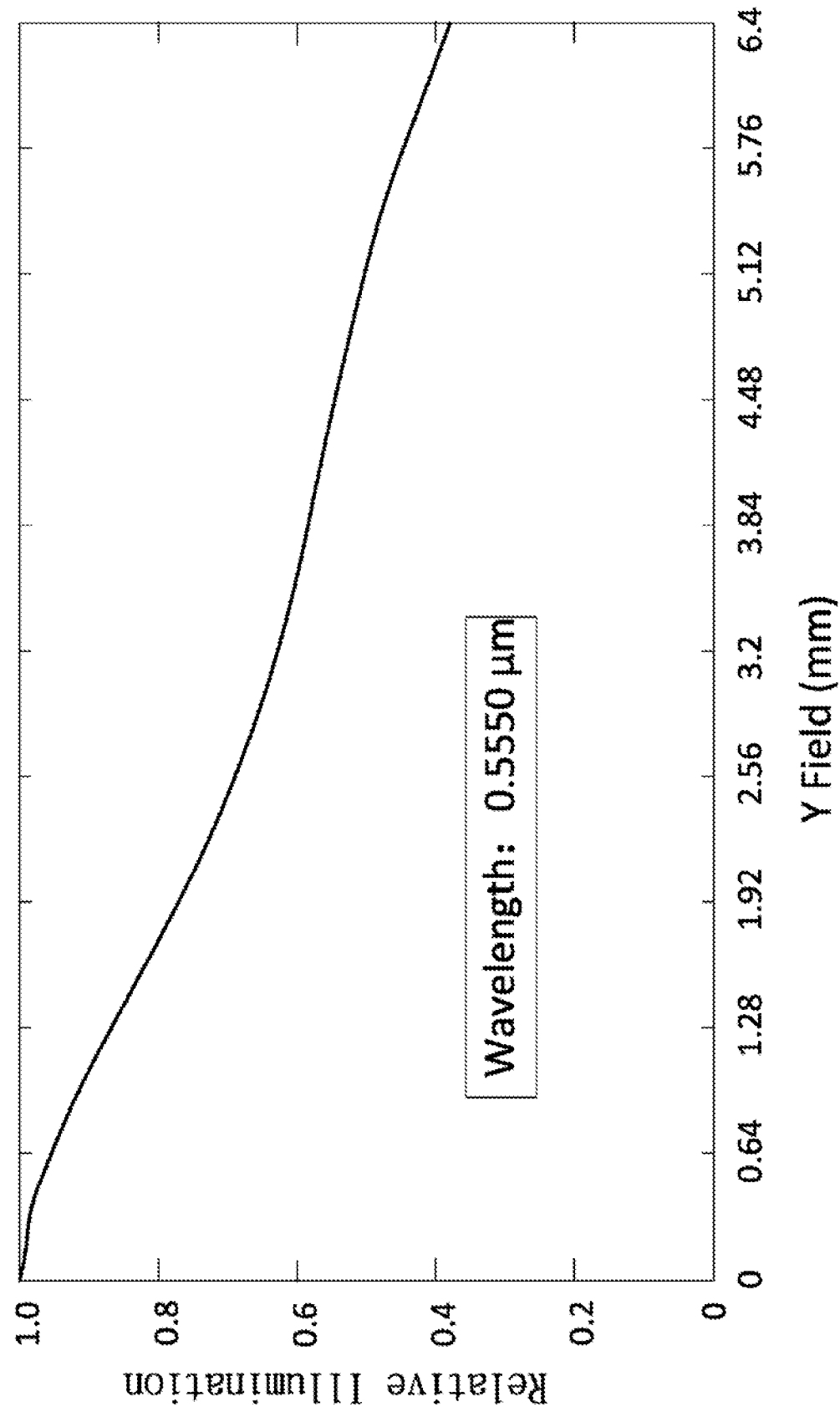
Figure 5:
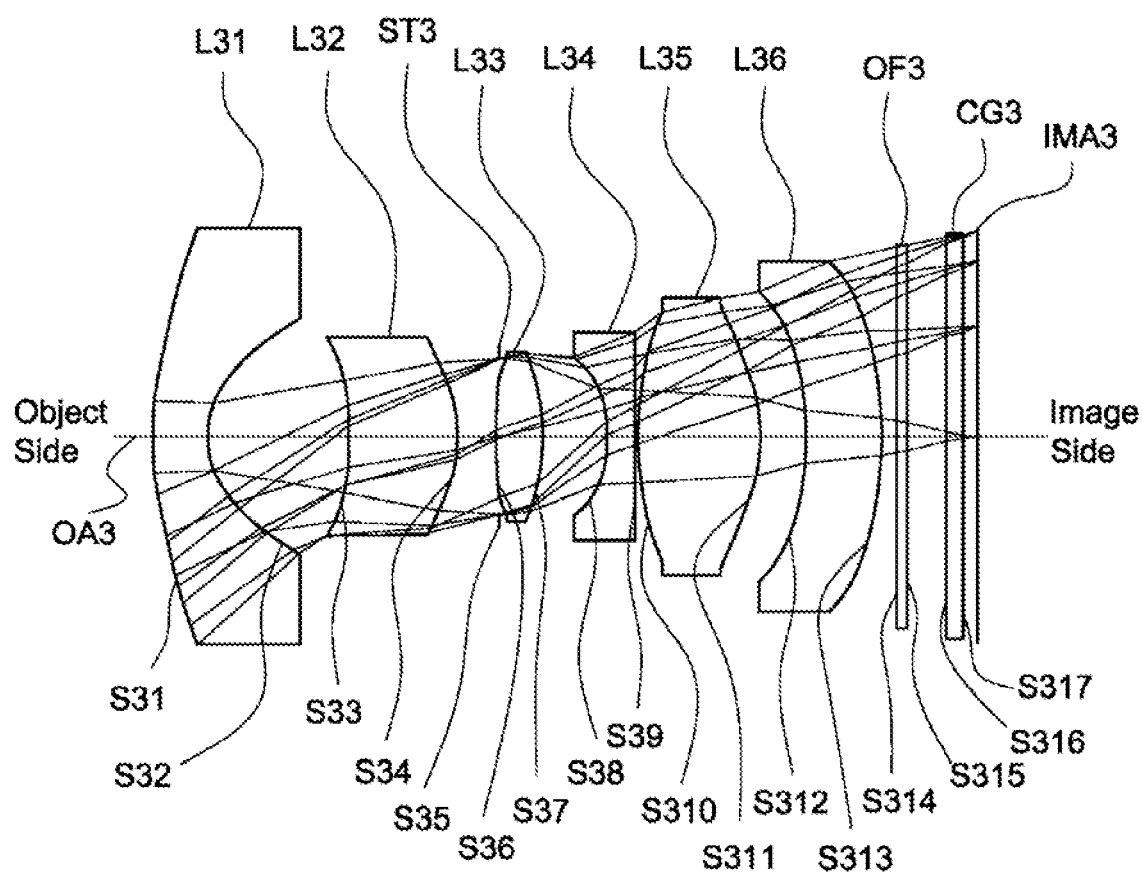
Figure 6A:
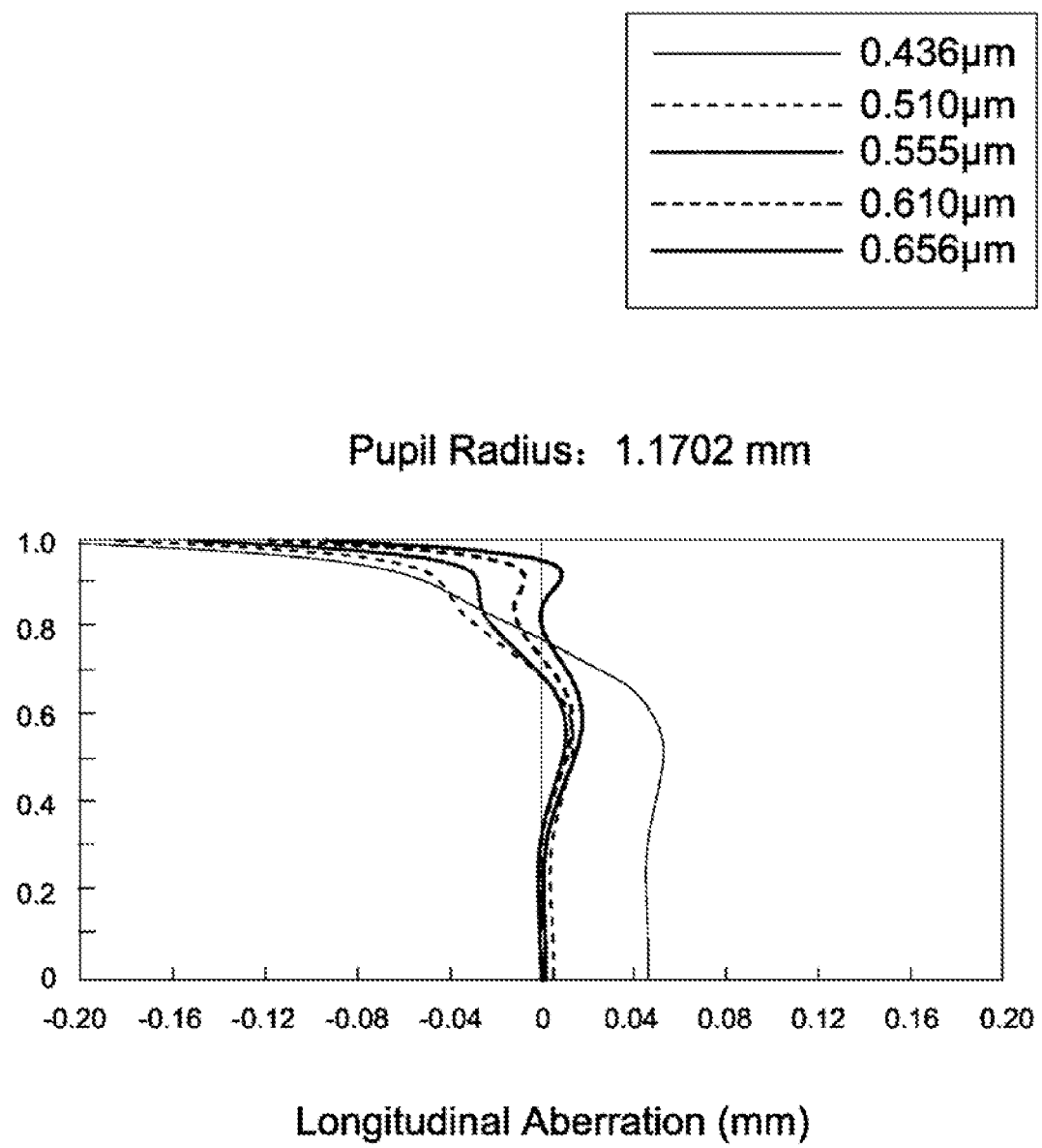
FIG. 6A, FIG. 6B, FIG. 6C, and FIG. 6D depict a longitudinal aberration diagram, a field curvature diagram, a distortion diagram, and a relative illumination of the wide-angle lens assembly in accordance with the third embodiment of the invention, respectively.
Figure 6B:
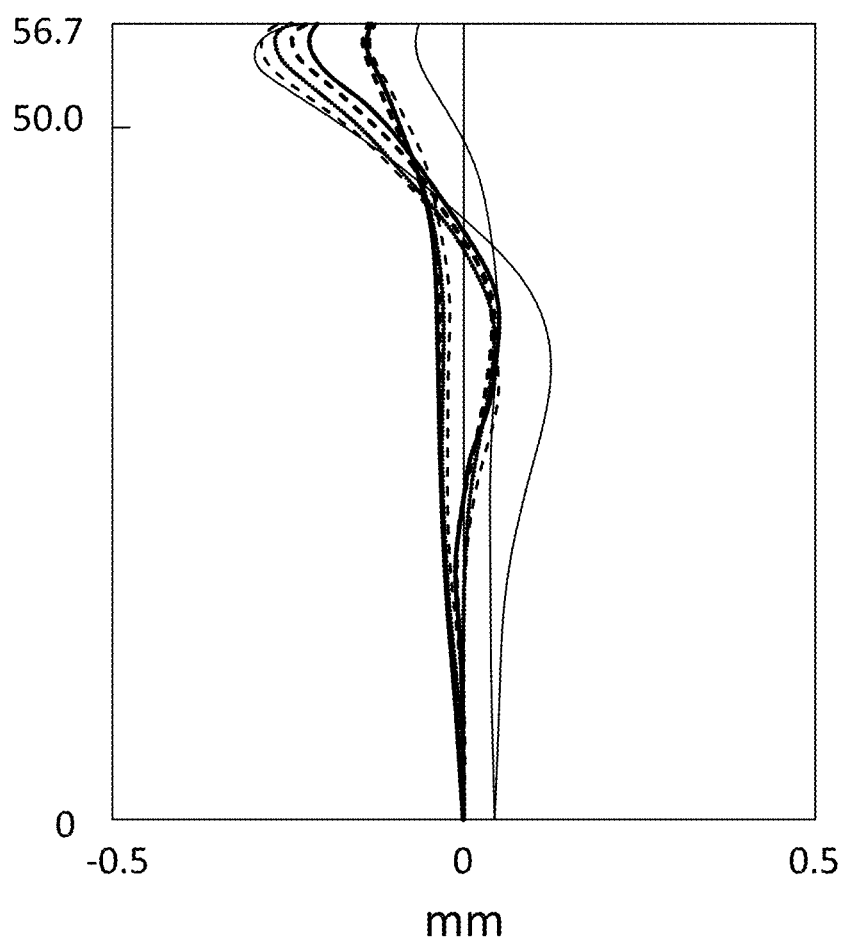
Figure 6C:
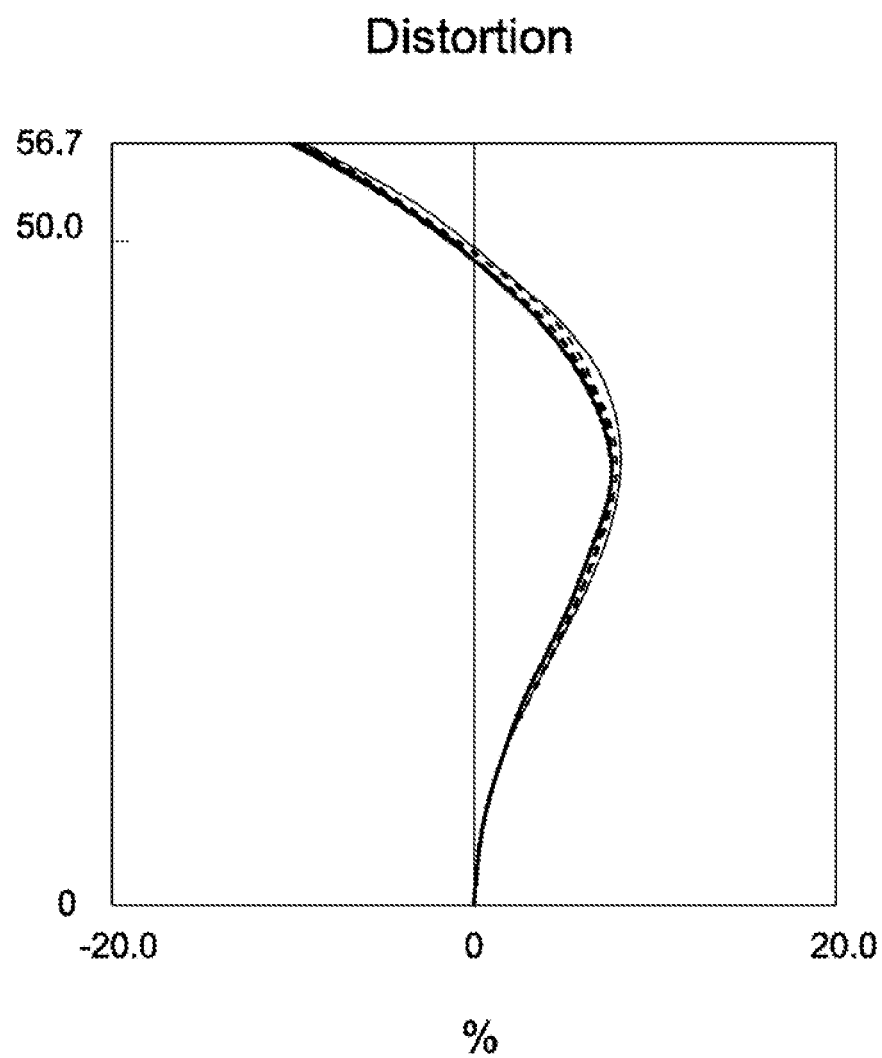
Figure 6D:
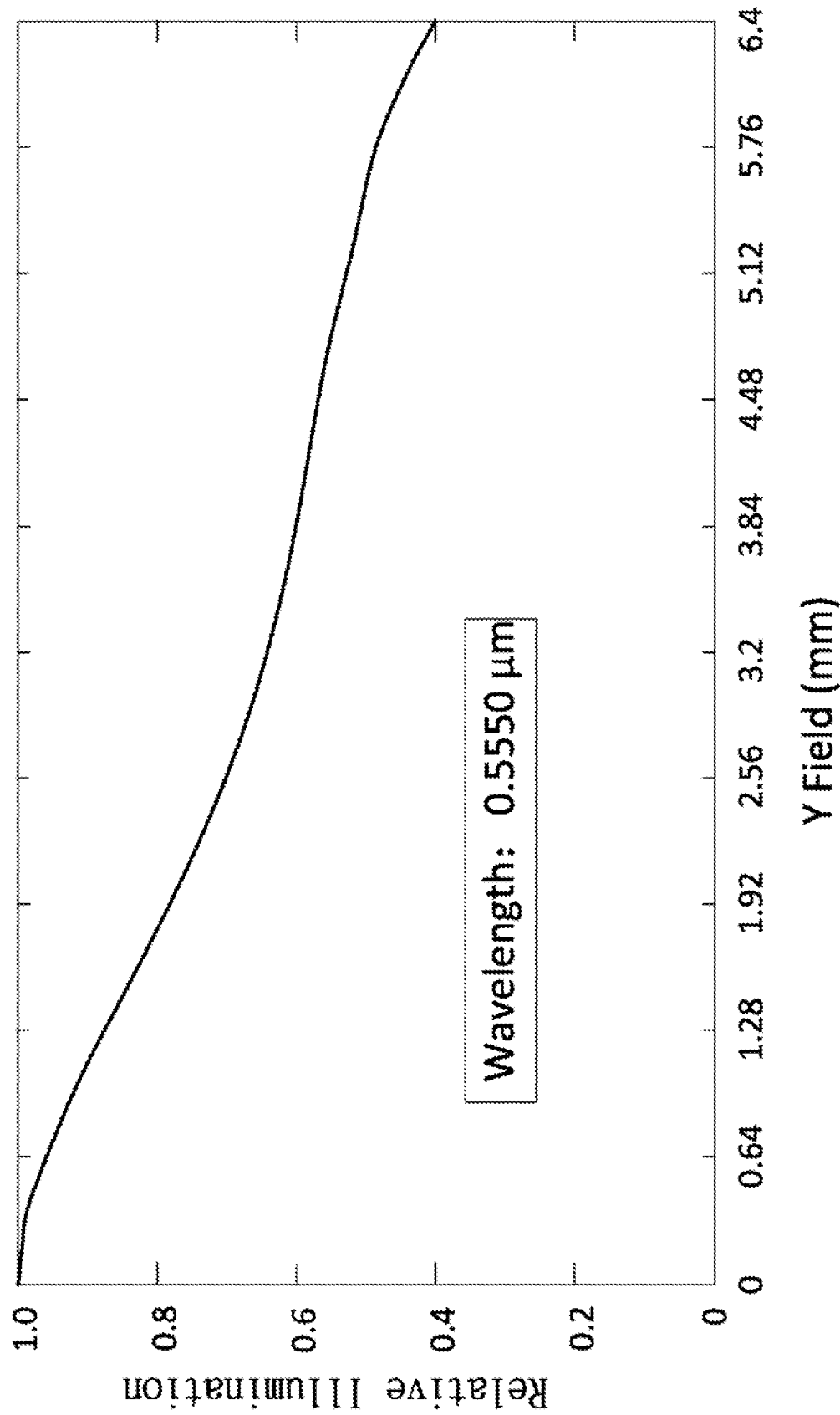
Figure 8A:
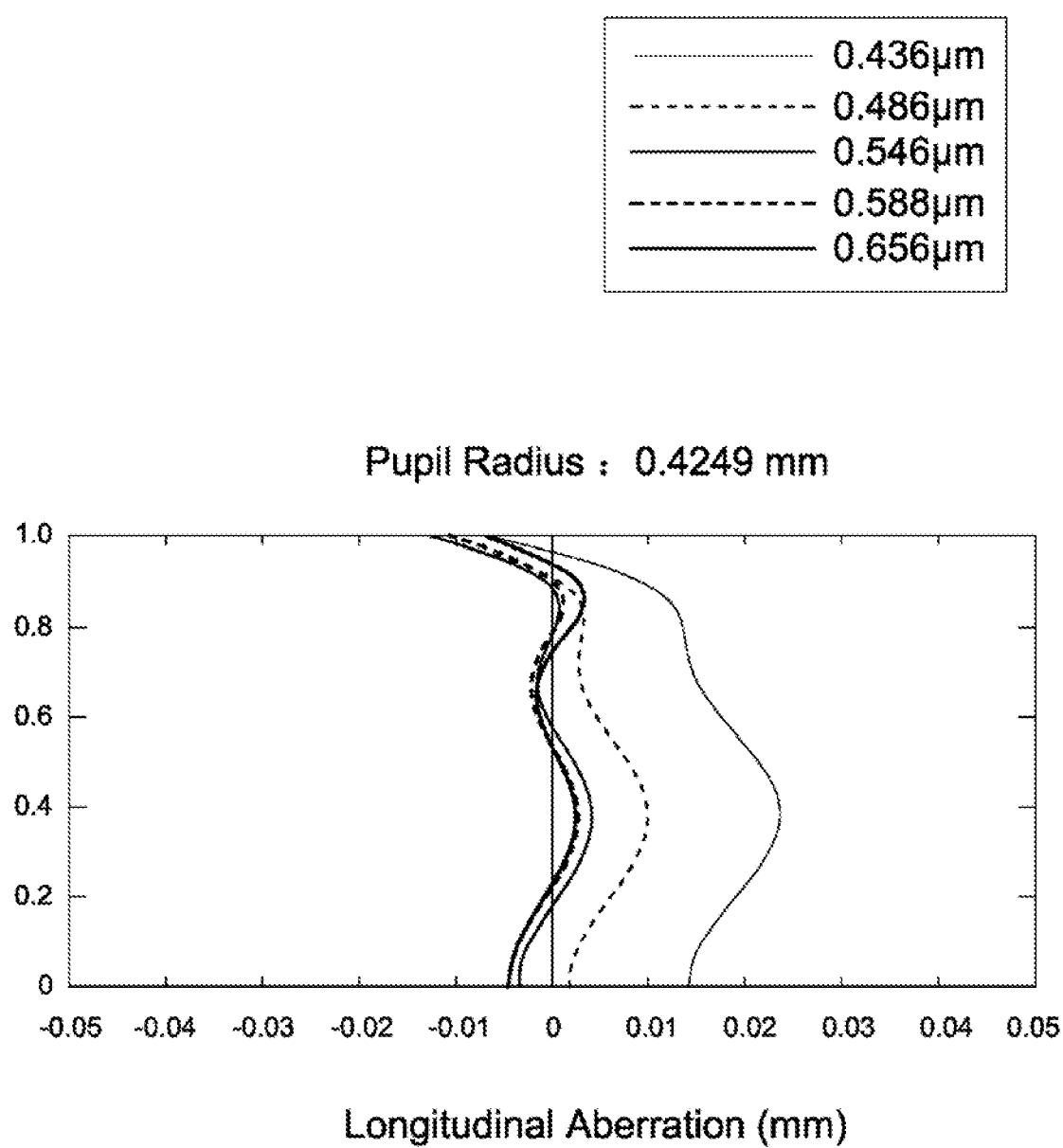
FIG. 8A, FIG. 8B, FIG. 8C, and FIG. 8D depict a longitudinal aberration diagram, a field curvature diagram, a distortion diagram, and a relative illumination of the wide-angle lens assembly in accordance with the fourth embodiment of the invention, respectively.
Figure 8B:
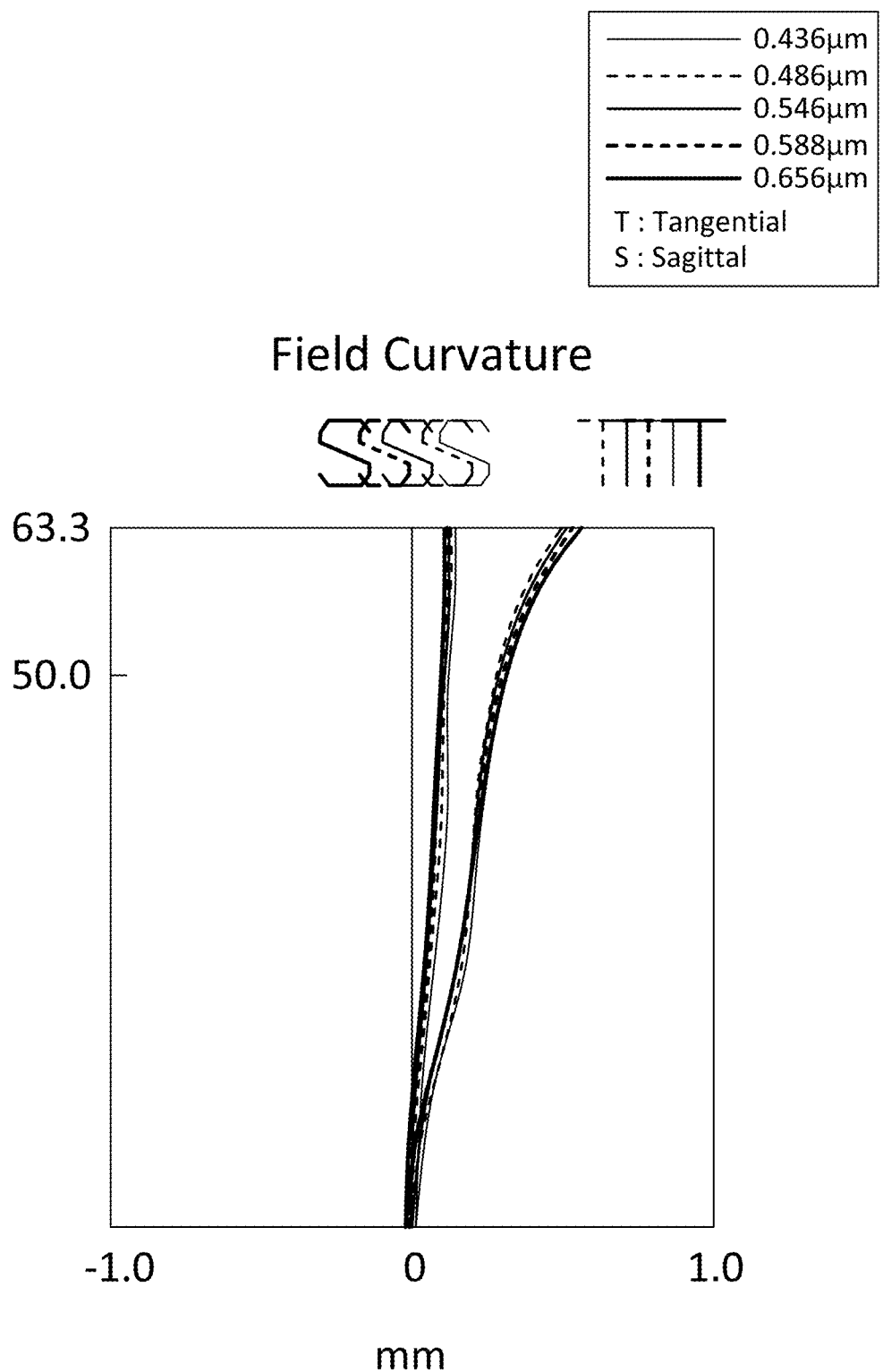
Figure 8C:
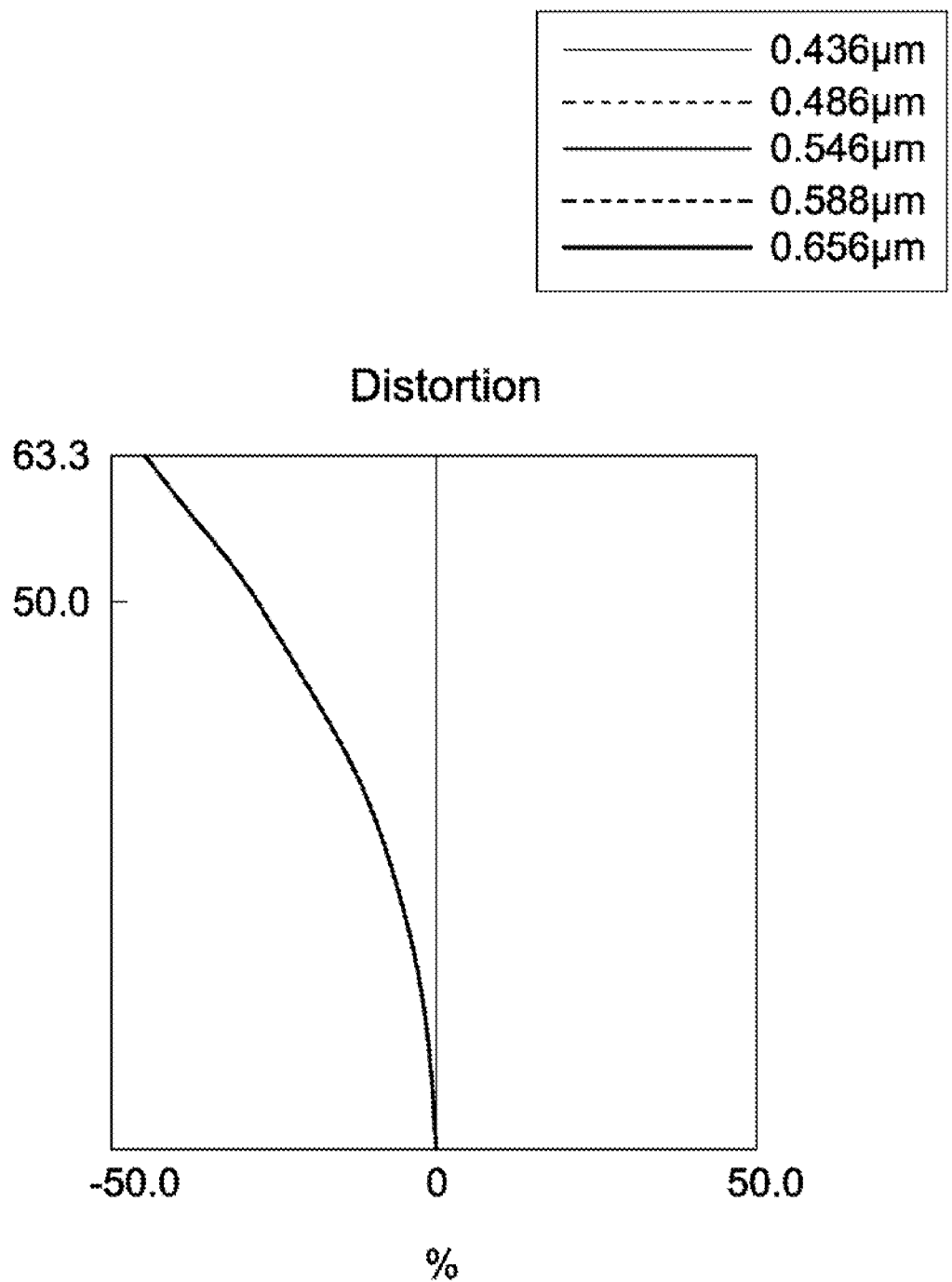
Figure 8D:
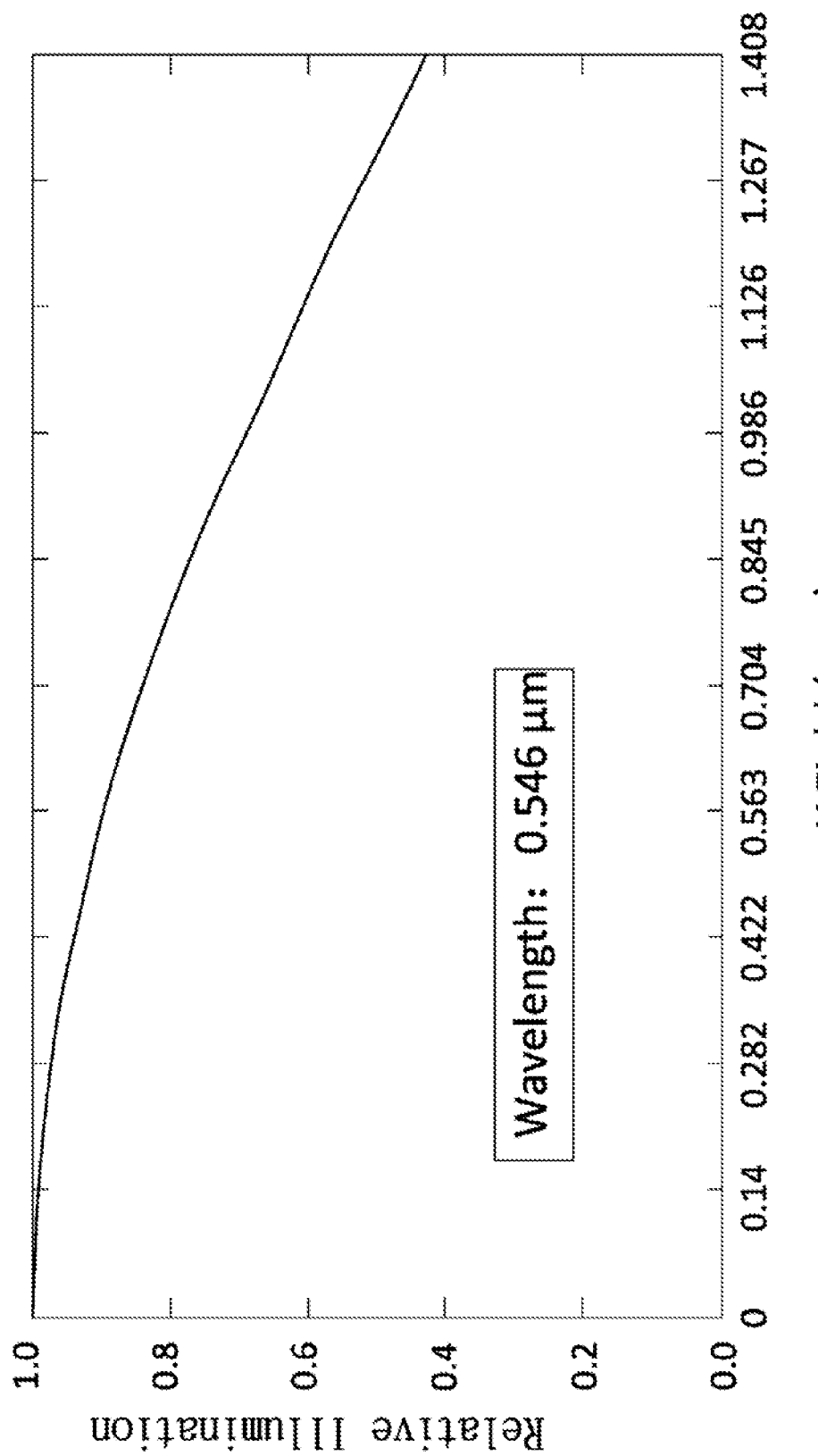

FIG. 1, FIG. 3, and FIG. 5 are lens layout and optical path diagrams of the wide-angle lens assemblies in accordance with the first, second, and third embodiments of the invention, respectively.

The first lenses L11, L21, L31 are meniscus lenses with negative refractive power and made of plastic material, wherein the object side surfaces S11, S21, S31 are convex surfaces, the image side surfaces S12, S22, S32 are concave surfaces, and both of the object side surfaces S11, S21, S31 and image side surfaces S12, S22, S32 are aspheric surfaces.

The second lenses L12, L22, L32 are meniscus lenses with positive refractive power and made of plastic material, wherein the object side surfaces S13, S23, S33 are concave surfaces, the image side surfaces S14, S24, S34 are convex surfaces, and both of the object side surfaces S13, S23, S33 and image side surfaces S14, S24, S34 are aspheric surfaces.

The third lenses L13, L23, L33 are biconvex lenses with positive refractive power and made of plastic material, wherein the object side surfaces S16, S26, S36 are convex surfaces, the image side surfaces S17, S27, S37 are convex surfaces, and both of the object side surfaces S16, S26, S36 and image side surfaces S17, S27, S37 are aspheric surfaces.

The fourth lenses L14, L24, L34 are biconcave lenses with negative refractive power and made of plastic material, wherein the object side surfaces S18, S28, S38 are concave surfaces, the image side surfaces S19, S29, S39 are concave surfaces, and both of the object side surfaces S18, S28, S38 and image side surfaces S19, S29, S39 are aspheric surfaces.

The fifth lenses L15, L25, L35 are biconvex lenses with positive refractive power and made of plastic material, wherein the object side surfaces S110, S210, S310 are convex surfaces, the image side surfaces S111, S211, S311 are convex surfaces, and both of the object side surfaces S110, S210, S310 and image side surfaces S111, S211, S311 are aspheric surfaces.

The sixth lenses L16, L26, L36 are meniscus lenses with positive refractive power and made of plastic material, wherein the object side surfaces S112, S212, S312 are concave surfaces, the image side surfaces S113, S213, S313 are convex surfaces, and both of the object side surfaces S112, S212, S312 and image side surfaces S113, S213, S313 are aspheric surfaces.

In the wide-angle lens assemblies 1-3, each two adjacent lenses between the first lens and the sixth lens includes an air gap along the optical axis, that is, the first lens, the second lens, the third lens, the fourth lens, the fifth lens, and the sixth lens can be six single non-cemented lenses. The manufacturing process of the cemented lens is more complicated than that of the non-cemented lens, especially the cemented surfaces of two lenses need to have a high-precision curved surface, so as to achieve a high degree of closeness when two lenses are cemented, and during the cementing process, it may have poor fit due to misalignment that affects the overall image quality. Therefore, any two adjacent lenses can have an air gap along the optical axis so as to ensure the ease of assembly and high yield rate for the wide-angle lens assembly of the present invention.

In addition, the lens assemblies 1, 2, 3 satisfy at least one of the following conditions:

$$0.6 < |R11/R41| < 2.4; \quad (1)$$

$$4 < R21/(R12+R22) < 13.5; \quad (2)$$

$$9.9 < R42/CT4 < 103; \quad (3)$$

$$1.3 < R51/(f2-CT5) < 3.5; \quad (4)$$

$$4 \text{ mm} < f2/(CT2-CT6) < 8.2 \text{ mm}; \quad (5)$$

$$5 \text{ mm} < |R61/Nd1| < 15 \text{ mm}; \quad (6)$$

$$11 \text{ mm} < |R41-f2| < 25 \text{ mm}; \quad (7)$$

$$-3.2 < f1/(R41+f5) < 2.3; \quad (8)$$

$$-13 < (R42+R41)/R32 < 0.3; \quad (9)$$

$$3.3 \text{ mm} < R42/(Vd3/Vd4) < 30 \text{ mm}; \quad (10)$$

$$5.2 \leq (CT1+CT2)/CT4 \leq 7.7; \quad (11)$$

$$4 \leq (Vd5/Vd6)-R22 \leq 12; \quad (12)$$

$$1 \leq |R61/R52| \leq 5; \quad (13)$$

wherein R11 is a radius of curvature of the object side surfaces S11, S21, S31 of the first lenses L11, L21, L31 for the first to third embodiments, R12 is a radius of curvature of the image side surfaces S12, S22, S32 of the first lenses L11, L21, L31 for the first to third embodiments, R21 is a radius of curvature of the object side surfaces S13, S23, S33 of the second lenses L12, L22, L32 for the first to third embodiments, R22 is a radius of curvature of the image side surfaces S14, S24, S34 of the second lenses L12, L22, L32 for the first to third embodiments, R32 is a radius of curvature of the image side surfaces S17, S27, S37 of the third lenses L13, L23, L33 for the first to third embodiments, R41 is a radius of curvature of the object side surfaces S18, S28, S38 of the fourth lenses L14, L24, L34 for the first to third embodiments, R42 is a radius of curvature of the image side surfaces S19, S29, S39 of the fourth lenses L14, L24, L34 for the first to third embodiments, R51 is a radius of curvature of the object side surfaces S110, S210, S310 of the fifth lenses L15, L25, L35 for the first to third embodiments, R52 is a radius of curvature of the image side surfaces S111, S211, S311 of the fifth lenses L15, L25, L35 for the first to third embodiments, R61 is a radius of curvature of the object side surfaces S112, S212, S312 of the sixth lenses L16, L26, L36 for the first to third embodiments, CT1 is an interval from the object side surfaces S11, S21, S31 to the image side surfaces S12, S22, S32 of the first lenses L11, L21, L31 along the optical axes OA1, OA2, OA3 for the first to third embodiments, CT2 is an interval from the object side surfaces S13, S23, S33 to the image side surfaces S14, S24, S34 of the second lenses L12, L22, L32 along the optical axes OA1, OA2, OA3 for the first to third embodiments, CT4 is an interval from the object side surfaces S18, S28, S38 to the image side surfaces S19, S29, S39 of the fourth lenses L14, L24, L34 along the optical axes OA1, OA2, OA3 for the first to third embodiments, CT5 is an interval from the object side surfaces S110, S210, S310 to the image side surfaces S11, S211, S311 of the fifth lenses L15, L25, L35 along the optical axes OA1, OA2, OA3 for the first to third embodiments, CT6 is an interval from the object side surfaces S112, S212, S312 to the image side surfaces S113, S213, S313 of the sixth lenses L16, L26, L36 along the optical axes OA1, OA2, OA3 for the first to third embodiments, f1 is an effective focal length of the first lenses L11, L21 L31 for the first to third embodiments, f2 is an effective focal length of the second lenses L12, L22 L32 for the first to third embodiments, f5 is an effective focal length of the fifth lenses L15, L25 L35 for the first to third embodiments, Nd1 is an index of refraction of the first lenses L11, L21, L31 for the first to third embodiments, Vd3 is an Abbe number of the third lenses L13, L23, L33 for the first to third embodiments, Vd4 is an Abbe number of the fourth lenses L14, L24, L34 for the first to third embodiments, Vd5 is an Abbe number of the fifth lenses L15, L25, L35 for the first to third embodiments, and Vd6 is an Abbe number of the sixth lenses L16, L26, L36 for the first to third embodiments. With the lens assemblies 1, 2, 3 satisfying at least one of the above conditions (1)–(13), the field of view can be effectively increased, the resolution can be effectively increased, and the aberration can be effectively corrected.

When the condition (1): 0.6<|R11/R41|<2.4 is satisfied, providing enough refractive power to control the field of view and help to correct aberration for the wide-angle lens assembly.

When the condition (2): 4<R21/(R12+R22)<13.5 is satisfied, providing enough refractive power to control the field of view and help to correct aberration for the wide-angle lens assembly.

When the condition (3): 9.9<R42/CT4<103 is satisfied, the fourth lens can have an appropriate thickness and effective focal length to correct off-axis aberration.

When the condition (4): 1.3<R51/(f2−CT5)<3.5 is satisfied, the fifth lens can have appropriate thickness and effective focal length to correct off-axis aberration.

When the condition (5): 4 mm<f2/(CT2−CT6)<8.2 mm is satisfied, the second lens and the sixth lens can have appropriate thickness and effective focal length to correct off-axis aberration.

When the condition (6): 5 mm<|R61/Nd1|<15 mm is satisfied, the aberration can be effectively corrected and the resolution can be effectively increased.

When the condition (7): 11 mm<|R41−f2|<25 mm is satisfied, the aberration can be effectively corrected and the resolution can be effectively increased.

When the condition (8): −3.2<f1/(R41+f5)<2.3 is satisfied, the aberration can be effectively corrected and the resolution can be effectively increased.

When the condition (9): −13<(R42+R41)/R32<0.3 is satisfied, the aberration can be effectively corrected and the resolution can be effectively increased.

When the condition (10): 3.3 mm<R42/(Vd3/Vd4)<30 mm is satisfied, the aberration can be effectively corrected and the resolution can be effectively increased.

A detailed description of a wide-angle lens assembly in accordance with a first embodiment of the invention is as follows. Referring to FIG. 1, the wide-angle lens assembly 1 includes a first lens L11, a second lens L12, a stop ST1, a third lens L13, a fourth lens L14, a fifth lens L15, a sixth lens L16, an optical filter OF1, and a cover glass CG1, all of which are arranged in order from an object side to an image side along an optical axis OA1. In operation, the light from the object side is imaged on an image plane IMA1.

According to the foregoing, wherein: both of the object side surface S114 and image side surface S1115 of the optical filter OF1 are plane surfaces; and both of the object side surface S116 and image side surface S117 of the cover glass CG1 are plane surfaces.

With the above design of the lenses, stop ST1, and at least one of the conditions (1)-(13) satisfied, the wide-angle lens assembly 1 can have an effective increased field of view, an effective increased resolution, and an effective corrected aberration.

Table 1 shows the optical specification of the wide-angle lens assembly 1 in FIG. 1.

TABLE 1

Effective Focal Length = 4.66 mm F-number = 2.00
Total Lens Length = 27.01 mm Field of View = 116.24 degrees

| Surface Number | Radius of Curvature (mm) | Thickness (mm) | Nd | Vd | Effective Focal Length (mm) | Remark |
|---|---|---|---|---|---|---|
| S11 | 8.21 | 1.78 | 1.545 | 55.987 | −8.14 | L11 |
| S12 | 2.66 | 5.20 | | | | |
| S13 | −7.58 | 3.50 | 1.545 | 55.987 | 12.52 | L12 |
| S14 | −4.18 | 1.47 | | | | |
| S15 | ∞ | −0.08 | | | | ST1 |
| S16 | 68.39 | 1.47 | 1.545 | 55.987 | 11.37 | L13 |
| S17 | −6.78 | 2.29 | | | | |
| S18 | −11.38 | 1.00 | 1.661 | 20.373 | −7.86 | L14 |
| S19 | 10.06 | 0.17 | | | | |
| S110 | 12.73 | 4.08 | 1.545 | 55.987 | 7.31 | L15 |
| S111 | −5.16 | 1.54 | | | | |
| S112 | −21.90 | 0.94 | 1.661 | 20.373 | 692.67 | L16 |
| S113 | −21.27 | 0.68 | | | | |
| S114 | ∞ | 0.30 | 1.517 | 64.167 | | OF1 |
| S115 | ∞ | 1.50 | | | | |
| S116 | ∞ | 0.50 | 1.517 | 64.167 | | CG1 |
| S117 | ∞ | 0.68 | | | | |

The aspheric surface sag z of each aspheric lens in table 1 can be calculated by the following formula:

$$Z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C, and D are aspheric coefficients.

In the first embodiment, the conic constant k and the aspheric coefficients A, B, C, D of each aspheric lens are shown in Table 2.

TABLE 2

| Surface Number | k | A | B | C | D |
|---|---|---|---|---|---|
| S11 | −1.044 | −1.26E−04 | −1.03E−05 | 1.35E−07 | 0 |
| S12 | −0.916 | 1.02E−03 | 3.39E−05 | −3.23E−06 | 0 |
| S13 | 0.000 | −2.34E−03 | 1.17E−04 | −1.34E−06 | 0 |
| S14 | −1.633 | 2.72E−03 | −1.50E−04 | 9.20E−06 | 0 |
| S16 | 0.000 | 0.00E+00 | 0.00E+00 | 0.00E+00 | 0 |
| S17 | −1514.254 | 9.01E−03 | −1.21E−03 | 1.51E−04 | −1.14E−05 |
| S18 | 2.869 | 3.52E−03 | −6.61E−04 | 1.19E−04 | −9.29E−06 |
| S19 | 0.000 | −8.58E−03 | 7.23E−04 | −5.75E−05 | −1.01E−06 |
| S110 | −3.434 | −3.52E−03 | 4.55E−04 | −3.19E−05 | 7.06E−07 |
| S111 | −0.499 | 2.11E−03 | −2.11E−04 | 1.03E−05 | −2.19E−07 |
| S112 | 0.000 | 2.06E−03 | 6.01E−05 | −4.42E−06 | 1.94E−07 |
| S113 | 0.000 | 5.23E−04 | −1.31E−04 | 9.99E−08 | 6.61E−08 |

Table 3 shows the parameters and condition values for conditions (1)-(13) in accordance with the first embodiment of the invention. It can be seen from Table 3 that the wide-angle lens assembly 1 of the first embodiment satisfies the conditions (1)-(13).

TABLE 3

| | | | | | |
|---|---|---|---|---|---|
| CT2 | 3.50 mm | CT4 | 1.00 mm | CT5 | 4.08 mm |
| CT6 | 0.94 mm | \| R11/R41 \| | 0.72 | R21/(R12 + R22) | 4.99 |
| R42/CT4 | 10.07 | R51/(f2 − CT5) | 1.51 | f2/(CT2 − CT6) | 4.89 mm |
| \| R61/Nd1 \| | 14.17 mm | \| R41 − f2 \| | 23.90 mm | f1/(R41 + f5) | 2.00 |
| (R42 + R41)/R32 | 0.19 | R42/(Vd3/Vd4) | 3.66 mm | (CT1 + CT2)/CT4 | 5.28 |
| (Vd5/Vd6) − R22 | 6.93 | \| R61/R52 \| | 4.24 | | |

In addition, the wide-angle lens assembly 1 of the first embodiment can meet the requirements of optical performance as seen in FIGS. 2A-2D. It can be seen from FIG. 2A that the longitudinal aberration in the wide-angle lens assembly 1 of the first embodiment ranges from −0.08 mm to 0.03 mm. It can be seen from FIG. 2B that the field curvature of tangential direction and sagittal direction in the wide-angle lens assembly 1 of the first embodiment ranges from −0.12 mm to 0.20 mm. It can be seen from FIG. 2C that the distortion in the wide-angle lens assembly 1 of the first embodiment ranges from −16% to 9%. It can be seen from FIG. 2D that the relative illumination in the wide-angle lens assembly 1 of the first embodiment ranges from 0.47 to 1.0 when the wavelength is 0.5550 μm and Y field ranges from 0 mm to 6.4 mm. It is obvious that the longitudinal aberration, the field curvature, and the distortion of the wide-angle lens assembly 1 of the first embodiment can be corrected effectively, and the relative illumination of the wide-angle lens assembly 1 of the first embodiment can meet the requirement. Therefore, the wide-angle lens assembly 1 of the first embodiment is capable of good optical performance.

Referring to FIG. 3, the wide-angle lens assembly 2 includes a first lens L21, a second lens L22, a stop ST2, a third lens L23, a fourth lens L24, a fifth lens L25, a sixth lens L26, an optical filter OF2, and a cover glass CG2, all of which are arranged in order from an object side to an image side along an optical axis OA2. In operation, the light from the object side is imaged on an image plane IMA2.

According to the foregoing, wherein: both of the object side surface S214 and image side surface S215 of the optical filter OF2 are plane surfaces; and both of the object side surface S216 and image side surface S217 of the cover glass CG2 are plane surfaces.

With the above design of the lenses, stop ST2, and at least one of the conditions (1)-(13) satisfied, the wide-angle lens assembly 2 can have an effective increased field of view, an effective increased resolution, and an effective corrected aberration.

Table 4 shows the optical specification of the wide-angle lens assembly 2 in FIG. 3.

TABLE 4

Effective Focal Length = 4.51 mm F-number = 2.00
Total Lens Length = 24.15 mm Field of View = 114.93 degrees

| Surface Number | Radius of Curvature (mm) | Thickness (mm) | Nd | Vd | Effective Focal Length (mm) | Remark |
|---|---|---|---|---|---|---|
| S21 | 10.39 | 1.46 | 1.545 | 55.987 | −6.41 | L21 |
| S22 | 2.49 | 4.22 | | | | |
| S23 | −13.21 | 3.32 | 1.545 | 55.987 | 7.82 | L22 |
| S24 | −3.51 | 1.22 | | | | |
| S25 | ∞ | −0.08 | | | | ST2 |
| S26 | 349.00 | 1.28 | 1.545 | 55.987 | 10.84 | L23 |
| S27 | −6.01 | 1.85 | | | | |
| S28 | −4.70 | 0.81 | 1.661 | 20.373 | −6.07 | L24 |
| S29 | 31.39 | 0.12 | | | | |
| S210 | 13.11 | 3.77 | 1.545 | 55.987 | 6.83 | L25 |
| S211 | −4.68 | 1.28 | | | | |
| S212 | −8.73 | 2.22 | 1.661 | 20.373 | 44.05 | L26 |
| S213 | −7.41 | 0.39 | | | | |
| S214 | ∞ | 0.30 | 1.517 | 64.167 | | OF2 |
| S215 | ∞ | 1.12 | | | | |
| S216 | ∞ | 0.50 | 1.517 | 64.167 | | CG2 |
| S217 | ∞ | 0.39 | | | | |

The definition of aspheric surface sag z of each aspheric lens in Table 4 is the same as that of in Table 1, and is not described here again.

In the second embodiment, the conic constant k and the aspheric coefficients A, B, C, D of each aspheric lens are shown in Table 5.

TABLE 5

| Surface Number | k | A | B | C | D |
|---|---|---|---|---|---|
| S21 | −2.245 | −2.77E−04 | −2.03E−06 | 1.13E−07 | 0 |
| S22 | −0.911 | 1.15E−03 | 8.83E−05 | −2.71E−06 | 0 |
| S23 | −1.923 | −4.94E−03 | 1.17E−05 | 8.78E−06 | 0 |
| S24 | −1.740 | 4.05E−03 | −4.75E−04 | 3.64E−05 | 0 |
| S26 | 0.000 | 0.00E+00 | 0.00E+00 | 0.00E+00 | 0 |
| S27 | 0.000 | 1.56E−02 | −2.06E−03 | 2.95E−04 | −2.36E−05 |
| S28 | 3.382 | 6.19E−03 | −1.06E−03 | 2.41E−04 | −1.88E−05 |
| S29 | 0.000 | −1.24E−02 | 8.97E−04 | −1.95E−05 | −1.58E−05 |
| S210 | 0.000 | −3.77E−03 | 8.57E−04 | −7.47E−05 | 2.27E−06 |
| S211 | 2.491 | 3.42E−03 | −4.07E−04 | 2.27E−05 | −5.16E−07 |

TABLE 5-continued

| Surface Number | k | A | B | C | D |
|---|---|---|---|---|---|
| S212 | −0.094 | 3.16E−03 | 7.47E−05 | −9.61E−06 | 4.27E−07 |
| S213 | −0.331 | 2.46E−03 | −2.32E−04 | 2.74E−07 | 1.73E−07 |

Table 6 shows the parameters and condition values for conditions (1)-(13) in accordance with the second embodiment of the invention. It can be seen from Table 6 that the wide-angle lens assembly 2 of the second embodiment satisfies the conditions (1)-(13).

TABLE 6

| CT2 | 3.32 mm | CT4 | 0.81 mm | CT5 | 3.77 mm |
|---|---|---|---|---|---|
| CT6 | 2.22 mm | \| R11/R41 \| | 2.21 | R21/(R12 + R22) | 12.88 |
| R42/CT4 | 38.75 | R51/(f2 − CT5) | 3.24 | f2/(CT2 − CT6) | 7.10 mm |
| \| R61/Nd1 \| | 5.65 mm | \| R41 − f2 \| | 12.52 mm | f1/(R41 + f5) | −3.01 |
| (R42 + R41)/R32 | −4.44 | R42/(Vd3/Vd4) | 11.42 mm | (CT1 + CT2)/CT4 | 5.90 |
| (Vd5/Vd6) − R22 | 6.26 | \| R61/R52 \| | 1.87 | | |

In addition, the wide-angle lens assembly 2 of the second embodiment can meet the requirements of optical performance as seen in FIGS. 4A-4D. It can be seen from FIG. 4A that the longitudinal aberration in the wide-angle lens assembly 2 of the second embodiment ranges from −0.20 mm to 0.05 mm. It can be seen from FIG. 4B that the field curvature of tangential direction and sagittal direction in the wide-angle lens assembly 2 of the second embodiment ranges from −0.35 mm to 0.15 mm. It can be seen from FIG. 4C that the distortion in the wide-angle lens assembly 2 of the second embodiment ranges from −10% to 9%. It can be seen from FIG. 4D that the relative illumination in the wide-angle lens assembly 2 of the second embodiment ranges from 0.38 to 1.0 when the wavelength is 0.5550 μm and Y field ranges from 0 mm to 6.4 mm. It is obvious that the longitudinal aberration, the field curvature, and the distortion of the wide-angle lens assembly 2 of the second embodiment can be corrected effectively, and the relative illumination of the wide-angle lens assembly 2 of the second embodiment can meet the requirement. Therefore, the wide-angle lens assembly 2 of the second embodiment is capable of good optical performance.

Referring to FIG. 5, the wide-angle lens assembly 3 includes a first lens L31, a second lens L32, a stop ST3, a third lens L33, a fourth lens L34, a fifth lens L35, a sixth lens L36, an optical filter OF3, and a cover glass CG3, all of which are arranged in order from an object side to an image side along an optical axis OA3. In operation, the light from the object side is imaged on an image plane IMA3.

According to the foregoing, wherein: both of the object side surface S314 and image side surface S315 of the optical filter OF3 are plane surfaces; and both of the object side surface S316 and image side surface S317 of the cover glass CG3 are plane surfaces.

With the above design of the lenses, stop ST3, and at least one of the conditions (1)-(13) satisfied, the wide-angle lens assembly 3 can have an effective increased field of view, an effective increased resolution, and an effective corrected aberration.

Table 7 shows the optical specification of the wide-angle lens assembly 3 in FIG. 5.

TABLE 7

Effective Focal Length = 4.68 mm  F-number = 2.10
Total Lens Length = 24.00 mm  Field of View = 113.48 degrees

| Surface Number | Radius of Curvature (mm) | Thickness (mm) | Nd | Vd | Effective Focal Length (mm) | Remark |
|---|---|---|---|---|---|---|
| S31 | 10.30 | 1.59 | 1.545 | 55.987 | −6.38 | L31 |
| S32 | 2.46 | 4.09 | | | | |
| S33 | −14.00 | 3.19 | 1.545 | 55.987 | 7.75 | L32 |
| S34 | −3.51 | 1.20 | | | | |
| S35 | ∞ | −0.07 | | | | ST3 |
| S36 | 328.00 | 1.35 | 1.545 | 55.987 | 10.89 | L33 |
| S37 | −6.05 | 1.87 | | | | |
| S38 | −4.38 | 0.80 | 1.661 | 20.373 | −6.21 | L34 |
| S39 | 82.00 | 0.11 | | | | |
| S310 | 13.30 | 3.54 | 1.545 | 55.987 | 6.92 | L35 |
| S311 | −4.79 | 1.34 | | | | |
| S312 | −8.06 | 2.22 | 1.661 | 20.373 | 53.3 | L36 |
| S313 | −7.29 | 0.42 | | | | |
| S314 | ∞ | 0.30 | 1.517 | 64.167 | | OF3 |
| S315 | ∞ | 1.14 | | | | |
| S316 | ∞ | 0.50 | 1.517 | 64.167 | | CG3 |
| S317 | ∞ | 0.42 | | | | |

The definition of aspheric surface sag z of each aspheric lens in Table 7 is the same as that of in Table 1, and is not described here again.

In the third embodiment, the conic constant k and the aspheric coefficients A, B, C, D of each aspheric lens are shown in Table 8.

TABLE 8

| Surface Number | k | A | B | C | D |
|---|---|---|---|---|---|
| S31 | −2.931 | −2.93E−04 | −1.91E−06 | 1.22E−07 | 0 |
| S32 | −0.922 | 1.01E−03 | 1.05E−04 | −4.72E−06 | 0 |

TABLE 8-continued

| Surface Number | k | A | B | C | D |
|---|---|---|---|---|---|
| S33 | −0.467 | −5.01E−03 | 1.76E−05 | 8.21E−06 | 0 |
| S34 | −1.707 | 4.05E−03 | −4.65E−04 | 3.58E−05 | 0 |
| S36 | 0.000 | 0.00E+00 | 0.00E+00 | 0.00E+00 | 0 |
| S37 | 0.000 | 1.58E−02 | −2.04E−03 | 2.98E−04 | −2.36E−05 |
| S38 | 3.362 | 6.16E−03 | −1.05E−03 | 2.43E−04 | −1.90E−05 |
| S39 | 0.000 | −1.25E−02 | 1.02E−03 | −2.96E−05 | −2.06E−05 |
| S310 | 0.000 | −3.75E−03 | 8.55E−04 | −7.47E−05 | 2.04E−06 |
| S311 | 2.787 | 3.46E−03 | −4.07E−04 | 2.25E−05 | −5.15E−07 |
| S312 | −0.077 | 3.16E−03 | 7.56E−05 | −9.73E−06 | 4.16E−07 |
| S313 | −0.490 | 2.54E−03 | −2.36E−04 | 2.28E−07 | 1.75E−07 |

Table 9 shows the parameters and condition values for conditions (1)-(13) in accordance with the third embodiment of the invention. It can be seen from Table 9 that the wide-angle lens assembly 3 of the third embodiment satisfies the conditions (1)-(13).

TABLE 9

| CT2 | 3.19 mm | CT4 | 0.80 mm | CT5 | 3.54 mm |
|---|---|---|---|---|---|
| CT6 | 2.22 mm | | R11/R41 | | 2.35 | R21/(R12 + R22) | 13.33 |
| R42/CT4 | 102.63 | R51/(f2 − CT5) | 3.16 | f2/(CT2 − CT6) | 7.99 mm |
| | R61/Nd1 | | 5.22 mm | | R41 − f2 | | 12.13 mm | f1/(R41 + f5) | −2.51 |
| (R42 + R41)/R32 | −12.83 | R42/(Vd3/Vd4) | 29.84 mm | (CT1 + CT2)/CT4 | 5.98 |
| (Vd5/Vd6) − R22 | 6.26 | | R61/R52 | | 1.68 | | |

In addition, the wide-angle lens assembly 3 of the third embodiment can meet the requirements of optical performance as seen in FIGS. 6A-6D. It can be seen from FIG. 6A that the longitudinal aberration in the wide-angle lens assembly 3 of the third embodiment ranges from −0.20 mm to 0.05 mm. It can be seen from FIG. 6B that the field curvature of tangential direction and sagittal direction in the wide-angle lens assembly 3 of the third embodiment ranges from −0.30 mm to 0.15 mm. It can be seen from FIG. 6C that the distortion in the wide-angle lens assembly 3 of the third embodiment ranges from −12% to 8%. It can be seen from FIG. 6D that the relative illumination in the wide-angle lens assembly 3 of the third embodiment ranges from 0.40 to 1.0 when the wavelength is 0.5550 μm and Y field ranges from 0 mm to 6.4 mm. It is obvious that the longitudinal aberration, the field curvature, and the distortion of the wide-angle lens assembly 3 of the third embodiment can be corrected effectively, and the relative illumination of the wide-angle lens assembly 3 of the third embodiment can meet the requirement. Therefore, the wide-angle lens assembly 3 of the third embodiment is capable of good optical performance.

Referring to Table 10, Table 11, Table 13, Table 14, Table 16, and Table 17, wherein Table 10, Table 13, and Table 16 show optical specification in accordance with a fourth, fifth, and sixth embodiments of the invention, respectively and Table 11, Table 14, and Table 17 show aspheric coefficients of each aspheric lens in Table 10, Table 13, and Table 16, respectively.

Figure 9:
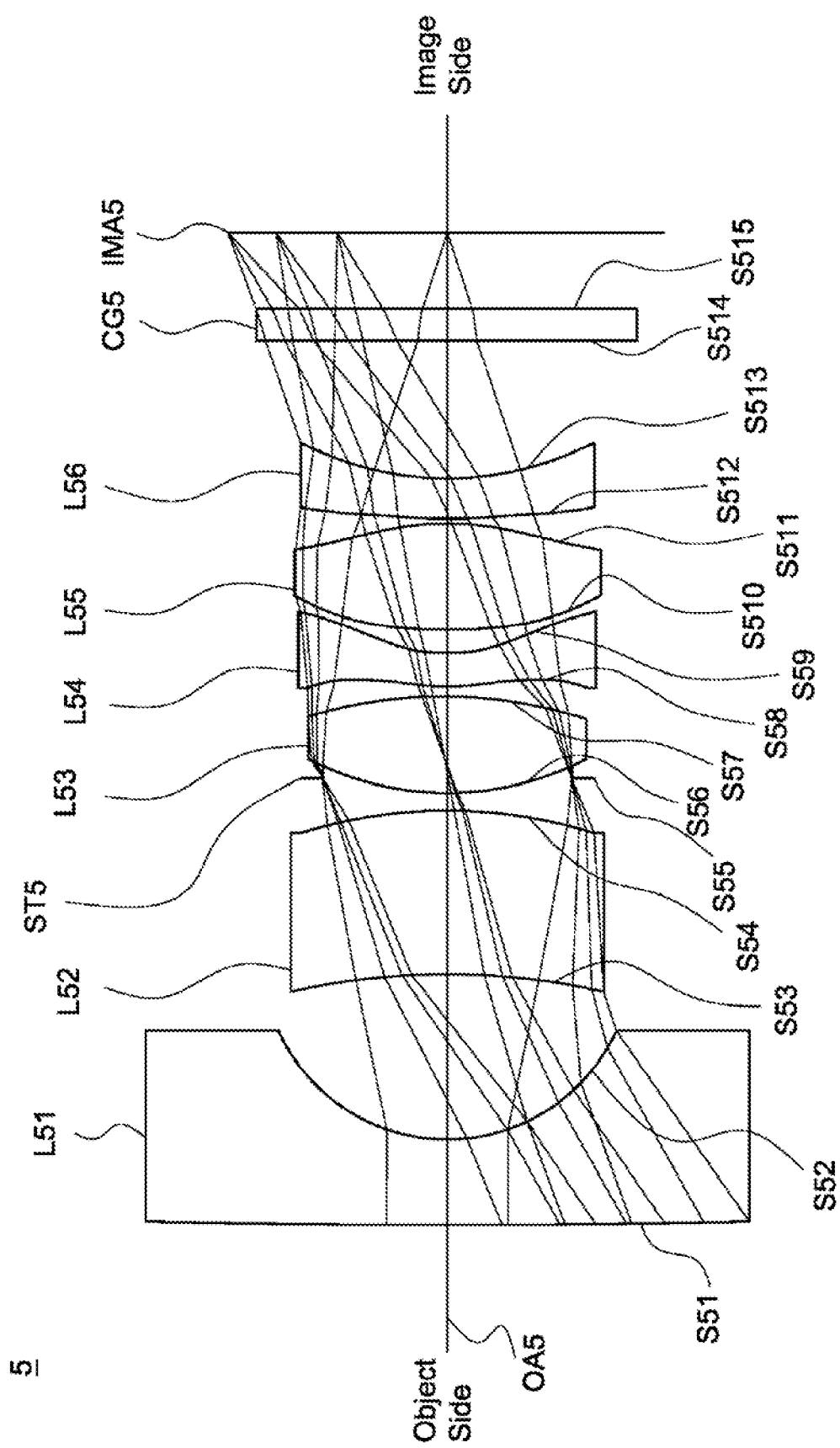
Figure 10A:
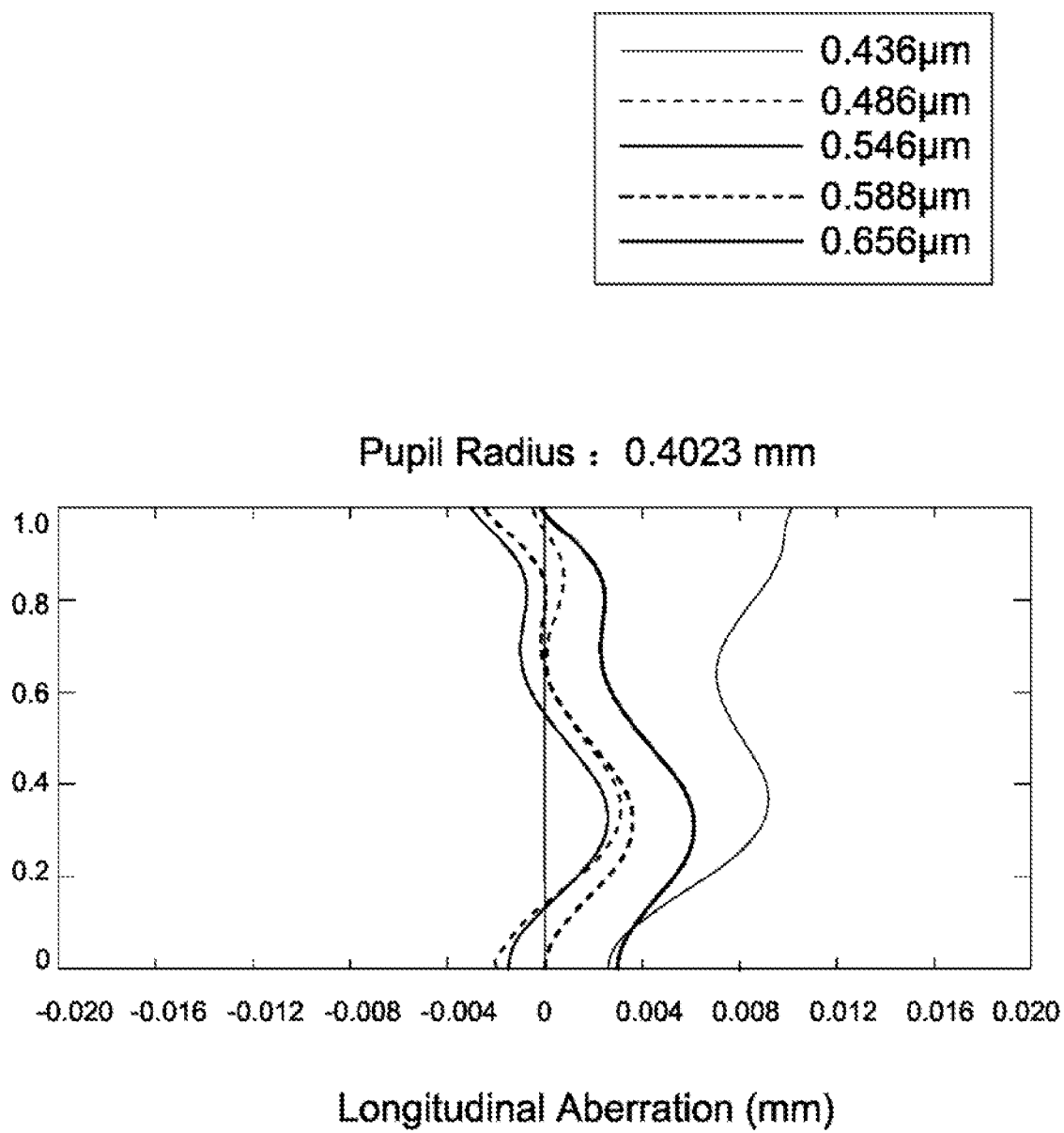
FIG. 10A, FIG. 10B, FIG. 10C, and FIG. 10D depict a longitudinal aberration diagram, a field curvature diagram, a distortion diagram, and a relative illumination of the wide-angle lens assembly in accordance with the fifth embodiment of the invention, respectively.
Figure 10B:
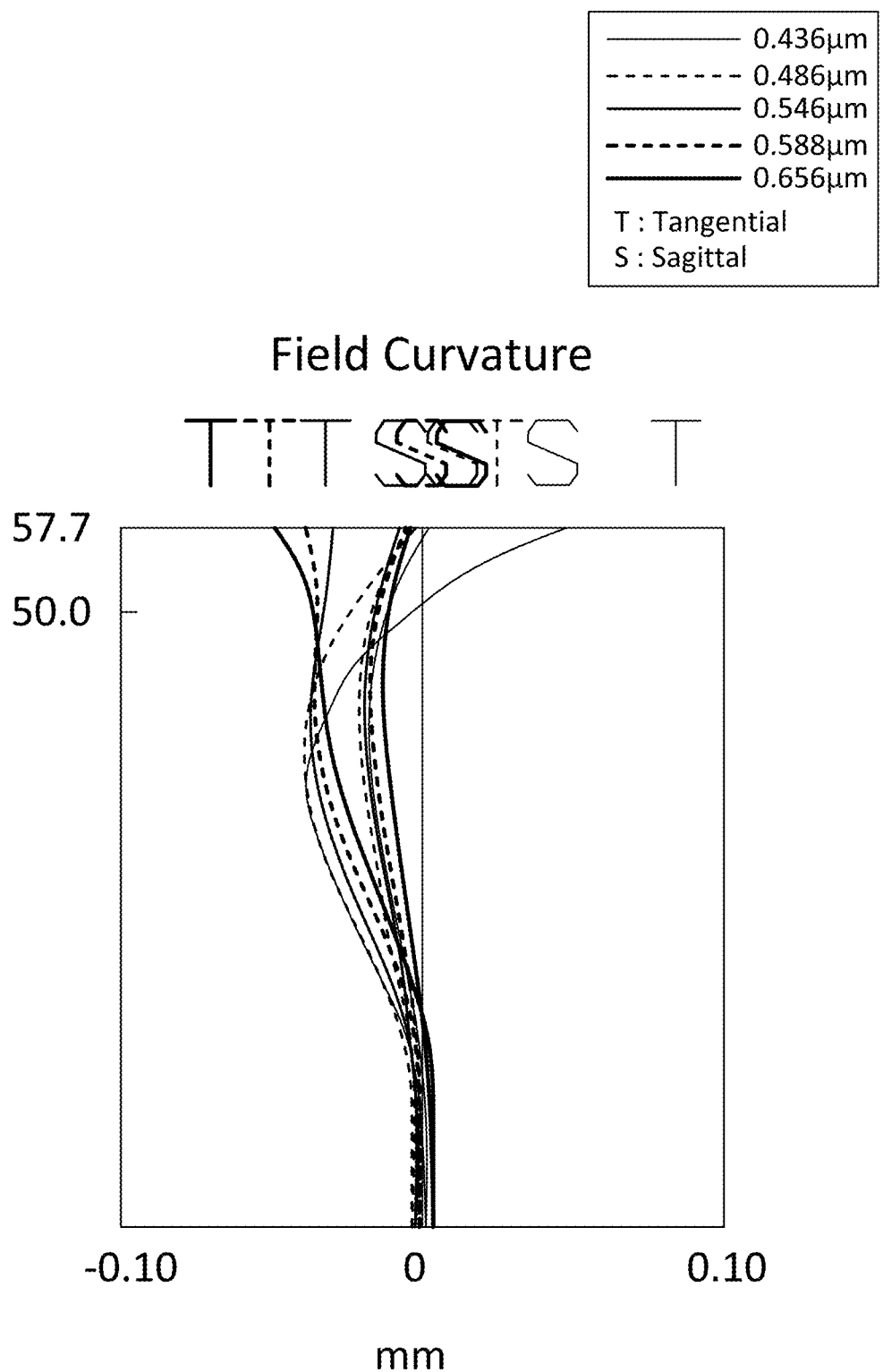
Figure 10C:
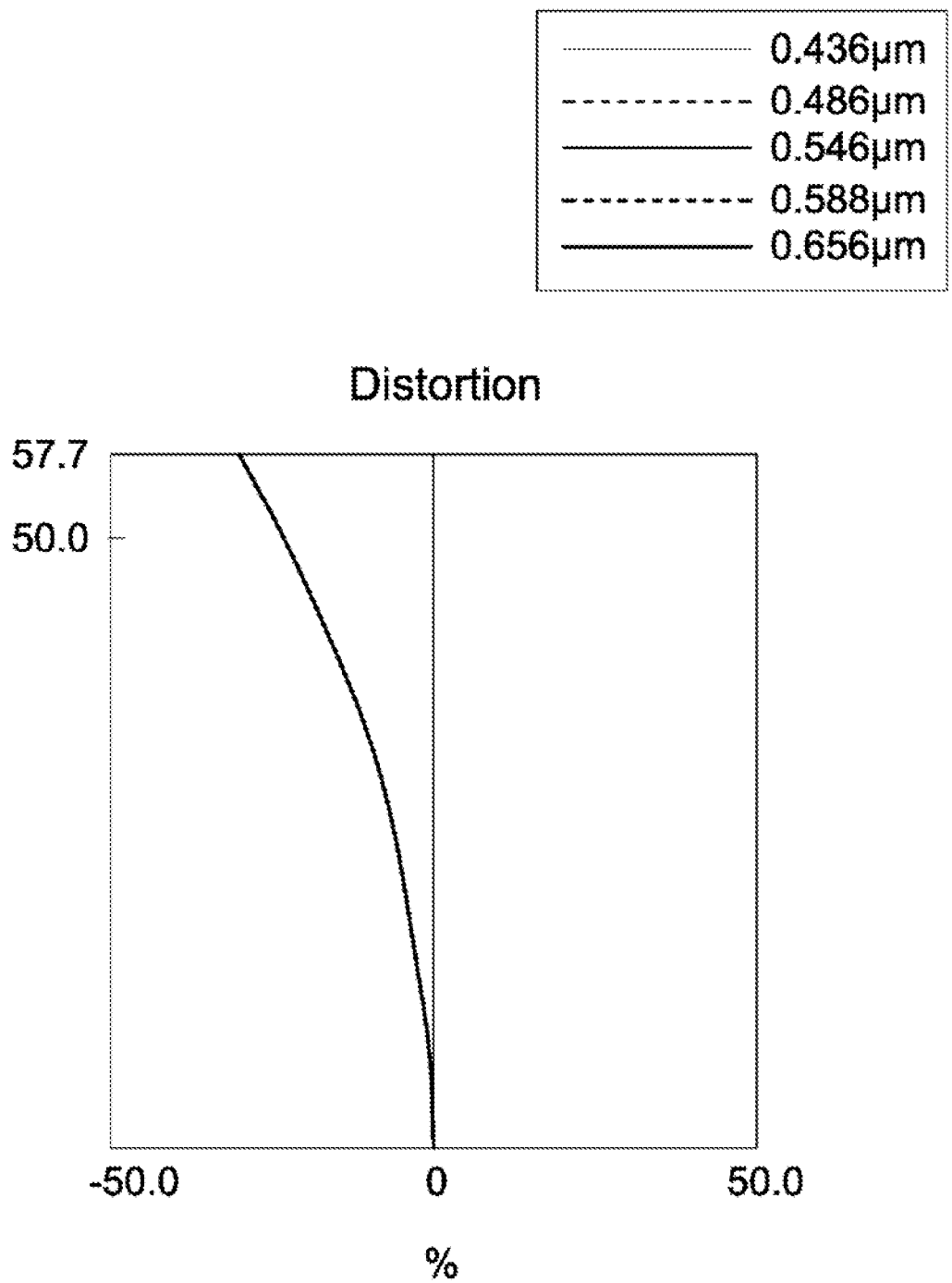
Figure 10D:
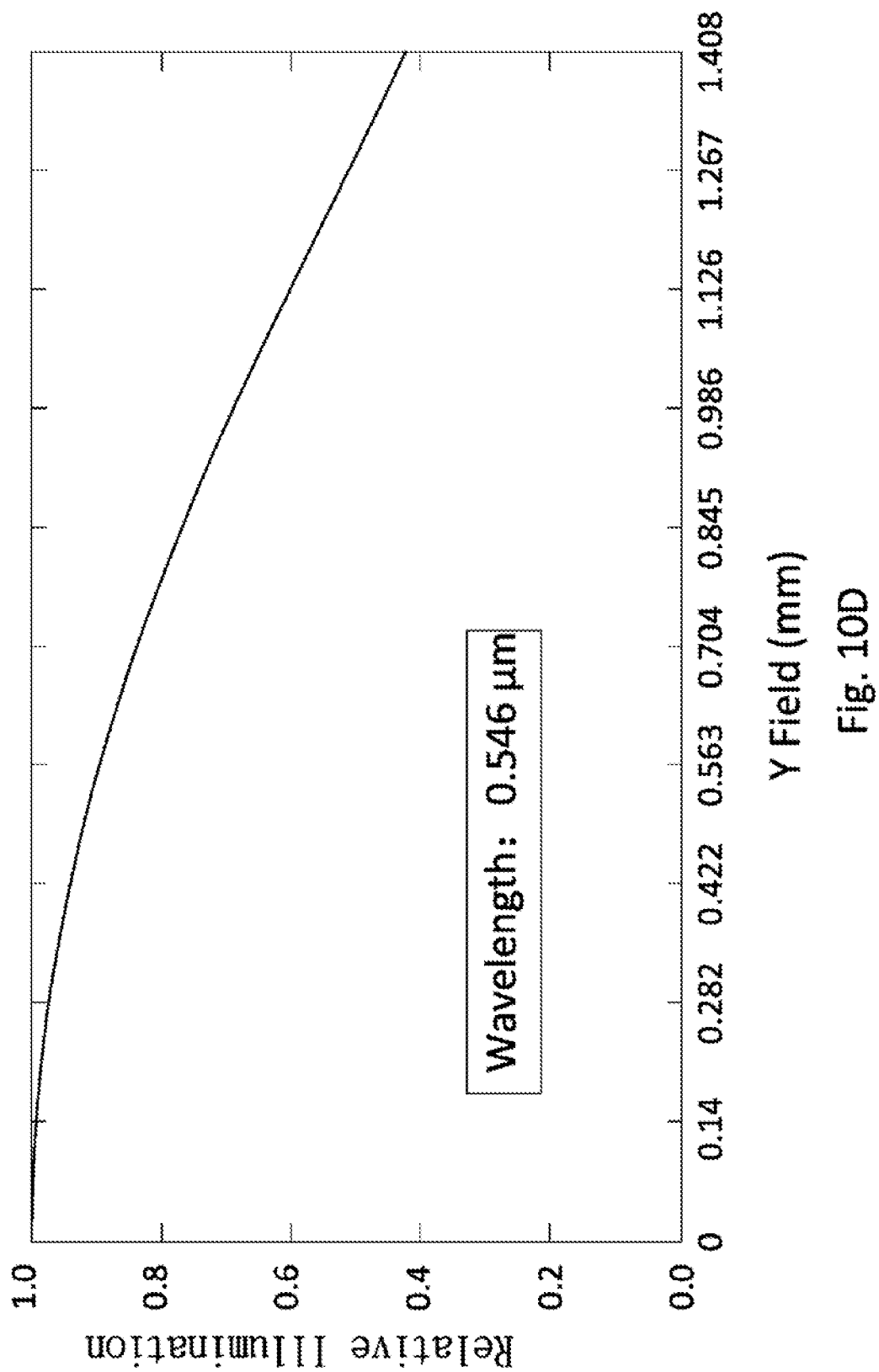
Figure 11:
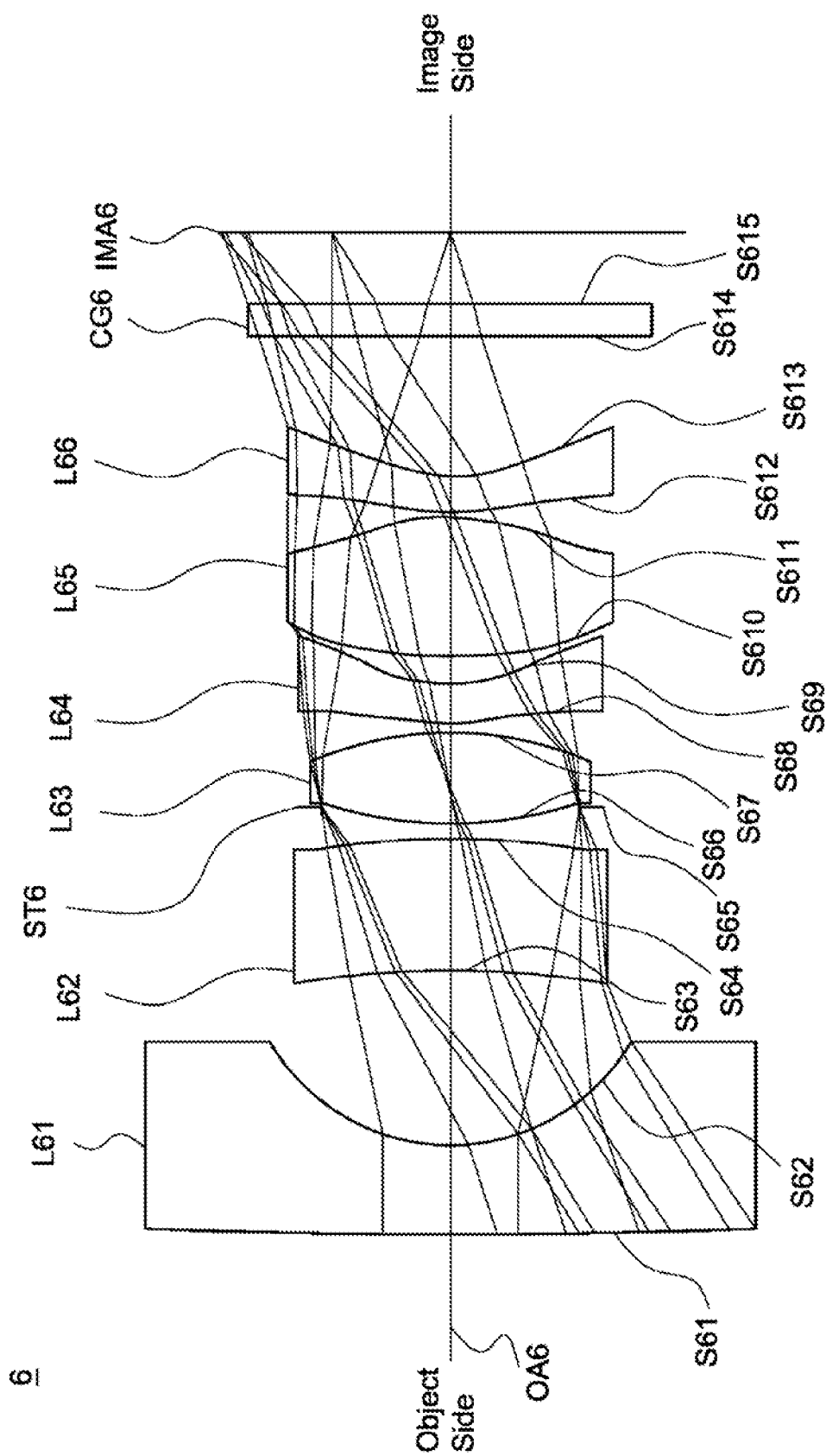
Figure 12A:
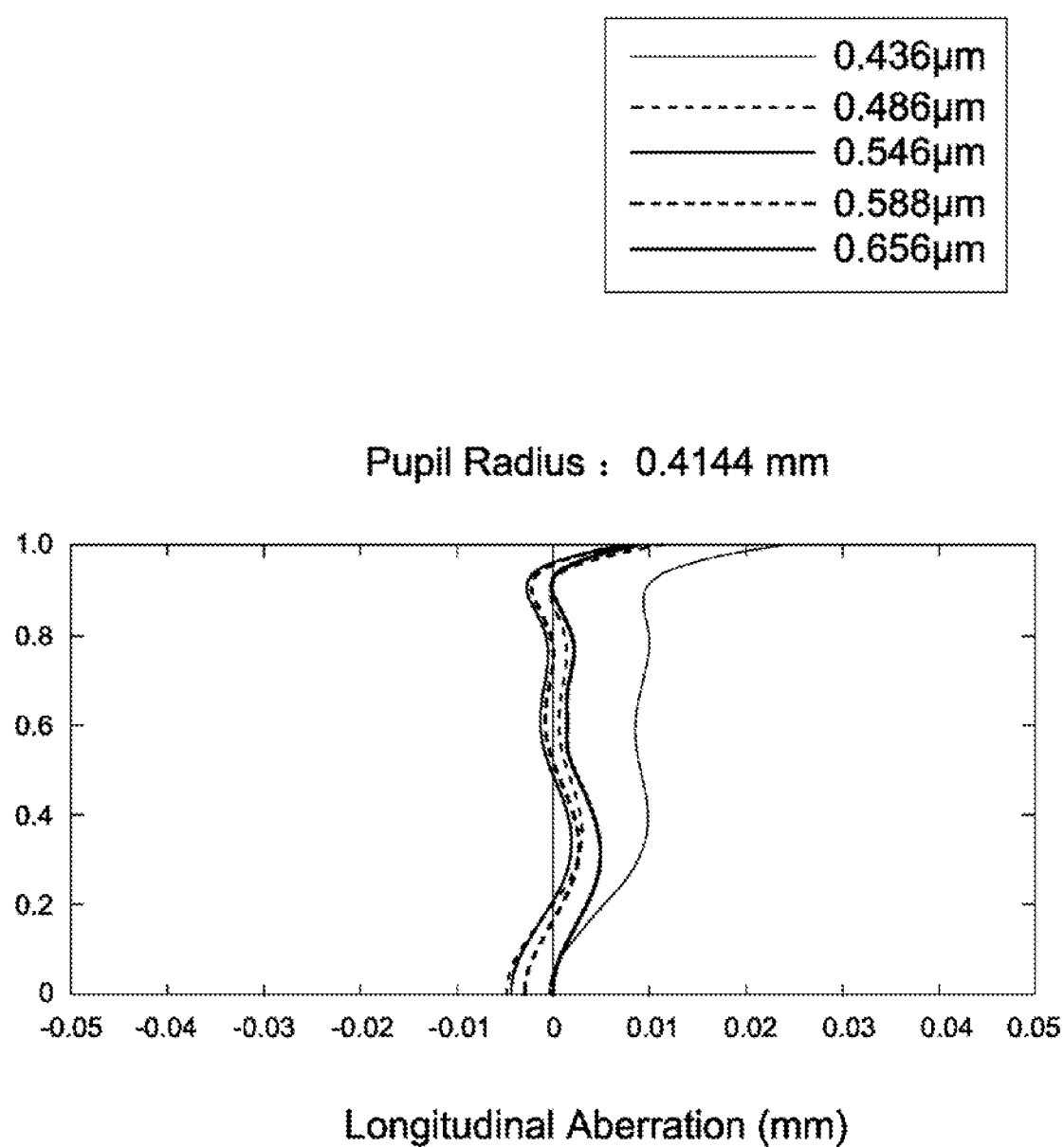
FIG. 12A, FIG. 12B, FIG. 12C, and FIG. 12D depict a longitudinal aberration diagram, a field curvature diagram, a distortion diagram, and a relative illumination of the wide-angle lens assembly in accordance with the sixth embodiment of the invention, respectively.
Figure 12B:
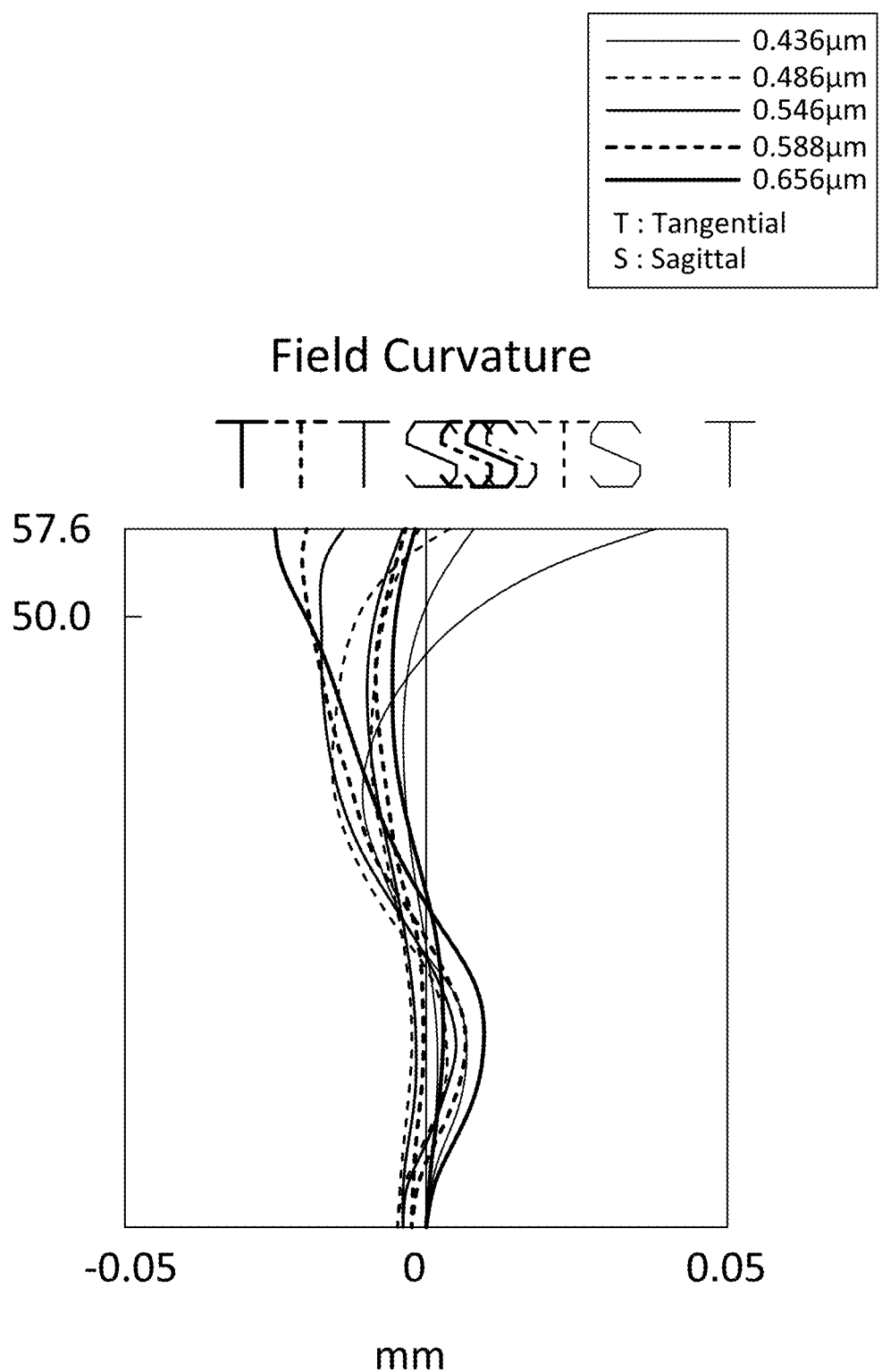
Figure 12C:
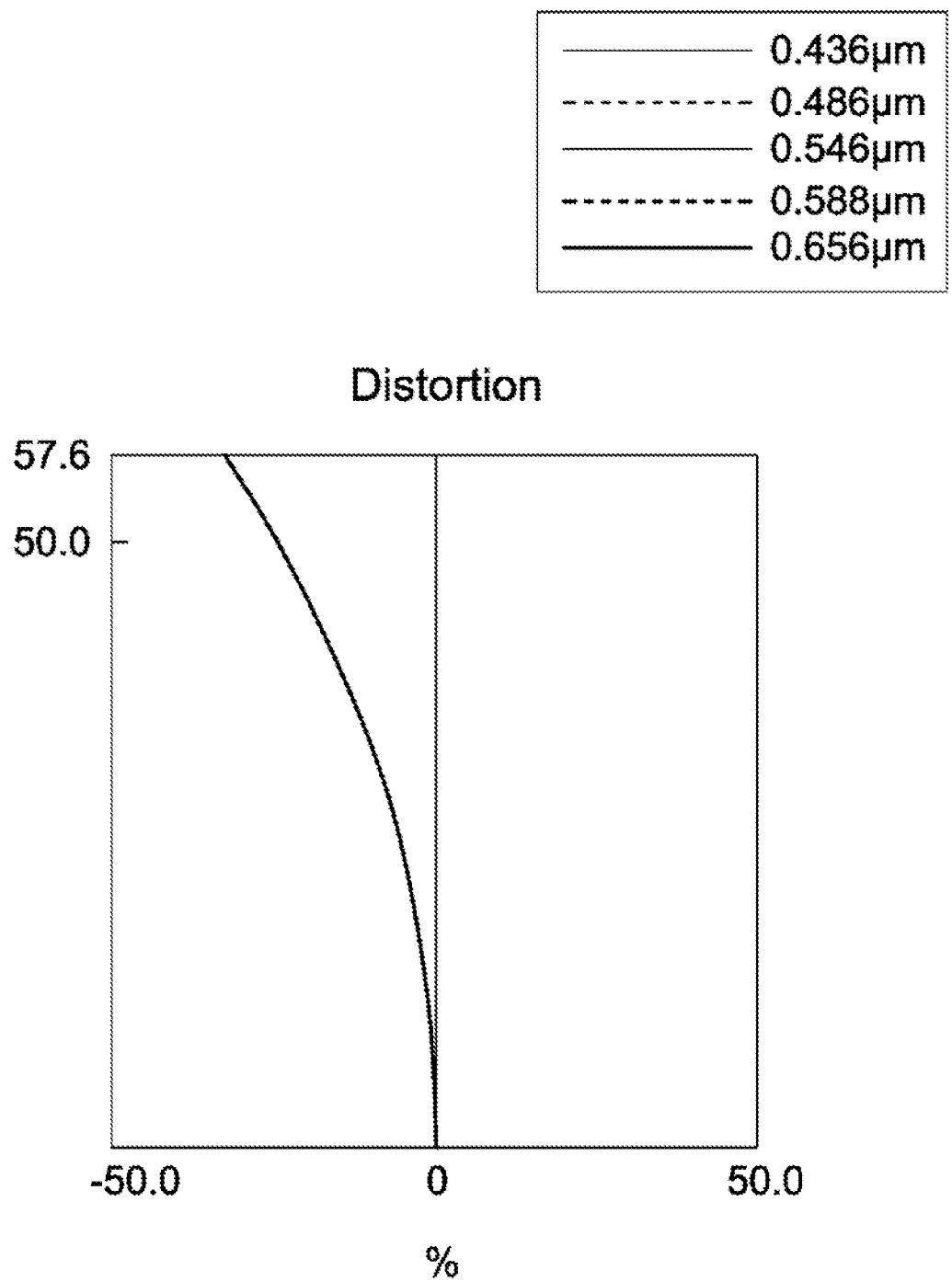
Figure 12D:
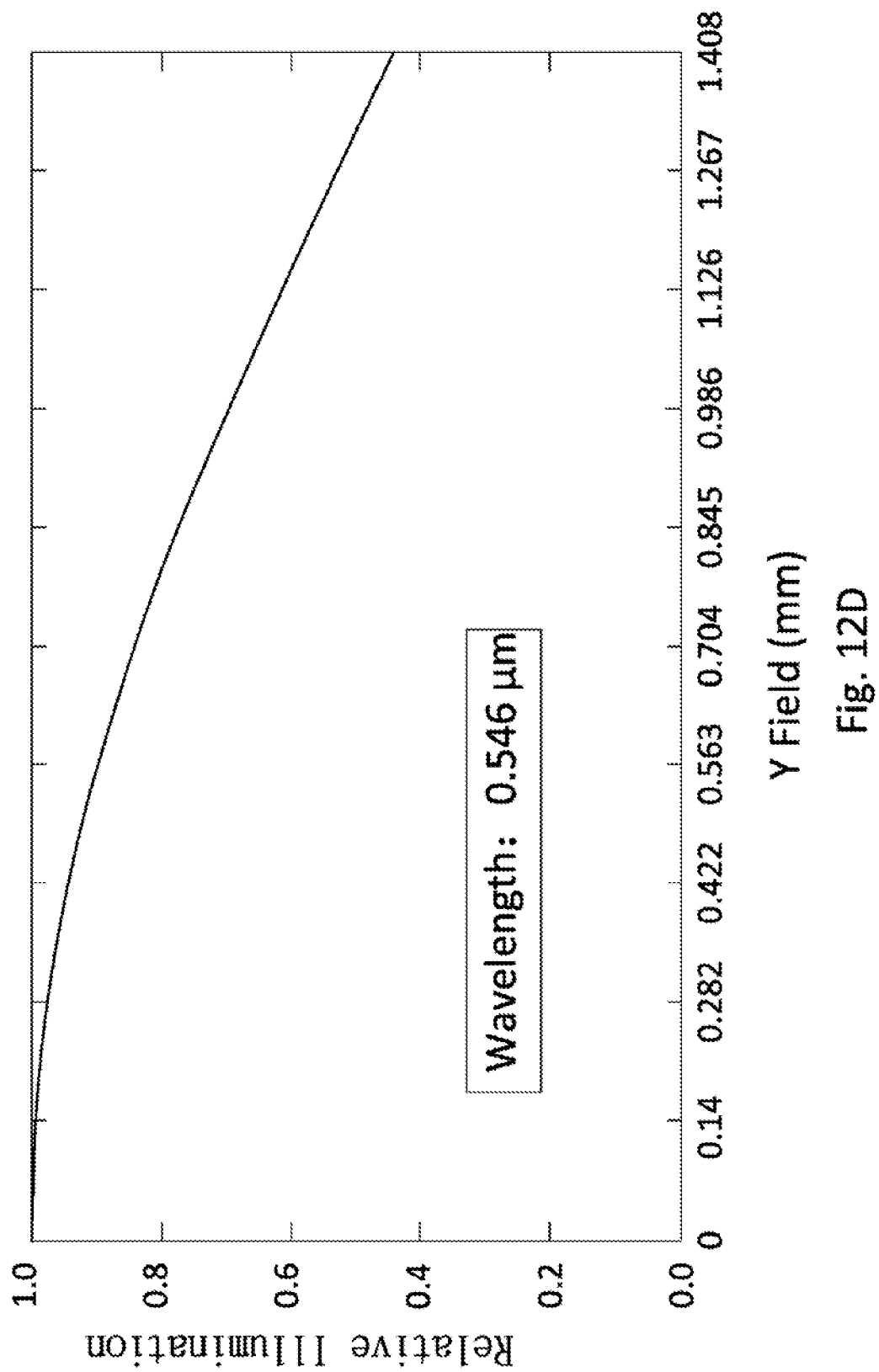

FIG. 7, FIG. 9, and FIG. 11 are lens layout and optical path diagrams of the lens assemblies in accordance with the fourth, fifth, and sixth embodiments of the invention, respectively.

The first lenses L41, L51, L61 are meniscus lenses with negative refractive power and made of plastic material, wherein the object side surfaces S41, S51, S61 are convex surfaces, the image side surfaces S42, S52, S62 are concave surfaces, the object side surfaces S41, S51, S61 are spherical surfaces, and the image side surfaces S42, S52, S62 are aspheric surfaces.

The second lenses L42, L52, L62 are meniscus lenses with positive refractive power and made of plastic material, wherein the object side surfaces S43, S53, S63 are concave surfaces, the image side surfaces S44, S54, S64 are convex surfaces, and both of the object side surfaces S43, S53, S63 and image side surfaces S44, S54, S64 are aspheric surfaces.

The third lenses L43, L53, L63 are biconvex lenses with positive refractive power and made of plastic material, wherein the object side surfaces S46, S56, S66 are convex surfaces, the image side surfaces S47, S57, S67 are convex surfaces, and both of the object side surfaces S46, S56, S67 and image side surfaces S47, S57, S67 are aspheric surfaces.

The fourth lenses L44, L54, L64 are with negative refractive power and made of plastic material, wherein the image side surfaces S49, S59, S69 are concave surfaces, and both of the object side surfaces S48, S58, S68 and image side surfaces S49, S59, S69 are aspheric surfaces.

The fifth lenses L45, L55, L65 are biconvex lenses with positive refractive power and made of glass material, wherein the object side surfaces S410, S510, S610 are convex surfaces, the image side surfaces S411, S511, S611 are convex surfaces, and both of the object side surfaces S410, S510, S610 and image side surfaces S411, S511, S611 are aspheric surfaces.

The sixth lenses L46, L56, L66 are meniscus lenses with negative refractive power and made of plastic material, wherein the object side surfaces S412, S512, S612 are convex surfaces, the image side surfaces S413, S513, S613 are concave surfaces, and both of the object side surfaces S412, S512, S612 and image side surfaces S413, S513, S613 are aspheric surfaces.

In the wide-angle lens assemblies 4-6, each two adjacent lenses between the first lens and the sixth lens includes an air gap along the optical axis, that is, the first lens, the second lens, the third lens, the fourth lens, the fifth lens, and the sixth lens can be six single non-cemented lenses. The manufacturing process of the cemented lens is more complicated than that of the non-cemented lens, especially the cemented surfaces of two lenses need to have a high-precision curved surface, so as to achieve a high degree of closeness when two lenses are cemented, and during the cementing process, it may have poor fit due to misalignment that affects the overall image quality. Therefore, any two adjacent lenses can have an air gap along the optical axis so as to ensure the ease of assembly and high yield rate for the wide-angle lens assembly of the present invention.

In addition, the lens assemblies 4, 5, 6, satisfy at least one of the conditions (1), (8), (11), (12), (13), and the following conditions (14)-(20):

$$25 \text{ mm} \leq R11/Nd2 \leq 50 \text{ mm}; \quad (14)$$

$$1.5 \text{ mm}^2 \leq f3 \times (CT1+CT2) \leq 3.5 \text{ mm}^2; \quad (15)$$

$$13 \text{ mm} \leq (R32)^2/CT4 \leq 23 \text{ mm}; \quad (16)$$

$$5 \text{ mm}^{-2} \leq (Vd1/R51)/f3 \leq 8.5 \text{ mm}^{-2}; \quad (17)$$

$$2 \leq (R62/Nd6)/CT4 \leq 6.5; \quad (18)$$

$$5 \text{ mm}^2 \leq (f4/(R52/R32))^2 \leq 21 \text{ mm}^2; \quad (19)$$

$$2 \text{ mm} \leq (f6)^2/R61 \leq 7 \text{ mm}; \quad (20)$$

wherein R11 is a radius of curvature of the object side surfaces S41, S51, S61 of the first lenses L41, L51, L51 for the fourth to sixth embodiments, R22 is a radius of curvature of the image side surfaces S44, S54, S64 of the second lenses L42, L52, L62 for the fourth to sixth embodiments, R32 is a radius of curvature of the image side surfaces S47, S57, S67 of the third lenses L43, L53, L63 for the fourth to sixth embodiments, R41 is a radius of curvature of the object side surfaces S48, S58, S68 of the fourth lenses L44, L54, L64 for the fourth to sixth embodiments, R51 is a radius of curvature of the object side surfaces S410, S510, S610 of the fifth lenses L45, L55, L65 for the fourth to sixth embodiments, R52 is a radius of curvature of the image side surfaces S411, S511, S611 of the fifth lenses L45, L55, L65 for the fourth to sixth embodiments, R61 is a radius of curvature of the object side surfaces S412, S512, S612 of the sixth lenses L46, L56, L66 for the fourth to sixth embodiments, R62 is a radius of curvature of the image side surfaces S413, S513, S613 of the sixth lenses L46, L56, L66 for the fourth to sixth embodiments, CT1 is an interval from the object side surfaces S41, S51, S61 to the image side surfaces S42, S52, S62 of the first lenses L41, L51, L61 along the optical axes OA4, OA5, OA6 for the fourth to sixth embodiments, CT2 is an interval from the object side surfaces S43, S53, S63 to the image side surfaces S44, S54, S64 of the second lenses L42, L52, L62 along the optical axes OA4, OA5, OA6 for the fourth to sixth embodiments, CT4 is an interval from the object side surfaces S48, S58, S68 to the image side surfaces S49, S59, S69 of the fourth lenses L44, L54, L64 along the optical axes OA4, OA5, OA6 for the fourth to sixth embodiments, f1 is an effective focal length of the first lenses L41, L51 L61 for the fourth to sixth embodiments, f3 is an effective focal length of the third lenses L43, L53 L63 for the fourth to sixth embodiments, f4 is an effective focal length of the fourth lenses L44, L54 L64 for the fourth to sixth embodiments, f5 is an effective focal length of the fifth lenses L45, L55 L65 for the fourth to sixth embodiments, f6 is an effective focal length of the sixth lenses L46, L56 L66 for the fourth to sixth embodiments, Nd2 is an index of refraction of the second lenses L42, L52, L62 for the fourth to sixth embodiments, Nd6 is an index of refraction of the sixth lenses L46, L56, L66 for the fourth to sixth embodiments, Vd1 is an Abbe number of the first lenses L41, L51, L61 for the fourth to sixth embodiments, Vd5 is an Abbe number of the fifth lenses L45, L55, L55 for the fourth to sixth embodiments, and Vd6 is an Abbe number of the sixth lenses L46, L56, L66 for the fourth to sixth embodiments. With the lens assemblies 4, 5, 6 satisfying at least one of the conditions (1), (8), (11), (12), (13), (14)-(20), the field of view can be effectively increased, the resolution can be effectively increased, the aberration can be effectively corrected, and the chromatic aberration can be effectively corrected.

When the condition (14): 25 mm≤R11/Nd2≤50 mm and condition (15): 1.5 mm²≤f3×(CT1+CT2)≤3.5 mm² are satisfied, the refractive power of the wide-angle lens assembly can be effectively provided to control the field of view and help to correct aberration.

When the condition (16): 13 mm s (R32)²/CT4≤23 mm, condition (17): 5 mm⁻²≤(Vd1/R51)/f3≤8.5 mm⁻², and condition (11): 5.2≤(CT1+CT2)/CT4≤7.7 are satisfied, the wide-angle lens assembly can have appropriate thickness and effective focal length to correct off-axis aberration.

When the condition (18): 2≤(R62/Nd6)/CT4≤6.5, condition (19): 5 mm²≤(f4/(R52/R32))²≤21 mm², condition (20): 2 mm≤(f6)²/R61≤7 mm, condition (12): 4≤(Vd5/Vd6)−R22≤12, and condition (13): 1≤|R61/R52|≤5 are satisfied, the aberration can be effectively corrected and the resolution can be effectively increased.

When the condition (15): 1.5 mm²≤f3×(CT1+CT2)≤3.5 mm², condition (16): 13 mm≤(R32)²/CT4≤23 mm, condition (17): 5 mm⁻²≤(Vd1/R51)/f3≤8.5 mm, and condition (13): 1≤|R61/R52|≤5 are satisfied, the field of view can be effectively controlled and the resolution can be effectively increased.

A detailed description of a wide-angle lens assembly in accordance with a fourth embodiment of the invention is as follows. Referring to FIG. 7, the wide-angle lens assembly 4 includes a first lens L41, a second lens L42, a stop ST4, a third lens L43, a fourth lens L44, a fifth lens L45, a sixth lens L46, and a cover glass CG4, all of which are arranged in order from an object side to an image side along an optical axis OA4. In operation, the light from the object side is imaged on an image plane IMA4.

According to the foregoing, wherein: the fourth lens L44 is a biconcave lens, wherein the object side surface S48 is a concave surface; and both of the object side surface S414 and image side surface S415 of the cover glass CG4 are plane surfaces.

With the above design of the lenses, stop ST4, and at least one of the conditions (1), (8), (11), (12), (13), and (14)-(20) satisfied, the wide-angle lens assembly 4 can have an effective increased field of view, an effective increased resolution, an effective corrected aberration, and an effective corrected chromatic aberration.

Table 10 shows the optical specification of the wide-angle lens assembly 4 in FIG. 7.

TABLE 10

| Effective Focal Length = 1.29 mm F-number = 1.60 | | | | | |
| Total Lens Length = 6.25 mm Field of View = 115.40 degrees | | | | | |

| Surface Number | Radius of Curvature (mm) | Thickness (mm) | Nd | Vd | Effective Focal Length (mm) | Remark |
|---|---|---|---|---|---|---|
| S41 | 45.00 | 0.44 | 1.5445 | 56.003 | −2.87 | L41 |
| S42 | 1.51 | 1.10 | | | | |
| S43 | −1.99 | 0.88 | 1.6613 | 20.373 | 19.18 | L42 |
| S44 | −2.03 | 0.21 | | | | |

TABLE 10-continued

Effective Focal Length = 1.29 mm F-number = 1.60
Total Lens Length = 6.25 mm Field of View = 115.40 degrees

| Surface Number | Radius of Curvature (mm) | Thickness (mm) | Nd | Vd | Effective Focal Length (mm) | Remark |
|---|---|---|---|---|---|---|
| S45 | ∞ | −0.11 | | | | ST4 |
| S46 | 1.64 | 0.54 | 1.5445 | 56.003 | 1.63 | L43 |
| S47 | −1.73 | 0.10 | | | | |
| S48 | −37.13 | 0.19 | 1.6613 | 20.373 | −1.99 | L44 |
| S49 | 1.38 | 0.15 | | | | |
| S410 | 4.16 | 0.71 | 1.69 | 52.75 | 1.66 | L45 |
| S411 | −1.48 | 0.02 | | | | |
| S412 | 7.11 | 0.32 | 1.6613 | 20.373 | −3.96 | L46 |
| S413 | 1.90 | 0.77 | | | | |
| S414 | ∞ | 0.21 | 1.5233 | 54.517 | | CG4 |
| S415 | ∞ | 0.72 | | | | |

The definition of aspheric surface sag z of each aspheric lens in Table 10 is the same as that of in Table 1, and is not described here again.

In the fourth embodiment, the conic constant k and the aspheric coefficients A, B, C, D of each aspheric lens are shown in Table 11.

TABLE 11

| Surface Number | k | A | B | C | D |
|---|---|---|---|---|---|
| S42 | 0.411 | 1.42E−02 | −7.85E−04 | 5.84E−03 | 0 |
| S43 | −10.932 | −1.81E−01 | 1.47E−01 | −3.40E−02 | 0 |
| S44 | 0.352 | −7.28E−02 | 1.55E−01 | −4.25E−02 | 0 |
| S46 | −6.871 | 1.32E−01 | −1.96E−01 | 2.75E−01 | 0 |
| S47 | −100.003 | −2.89E−01 | 7.13E−01 | −1.097 | 9.18E−01 |
| S48 | 0 | −1.44E−01 | 1.44E−01 | 3.04E−02 | −6.84E−02 |
| S49 | −31.262 | 4.63E−02 | 1.27E−01 | −1.71E−01 | 6.46E−02 |
| S410 | −453.838 | 1.08E−01 | 3.99E−02 | −2.14E−01 | 1.22E−01 |
| S411 | −4.993 | −1.66E−02 | −9.21E−03 | −7.43E−02 | 4.54E−02 |
| S412 | 0 | −9.55E−02 | 8.67E−02 | −4.57E−02 | 1.71E−02 |
| S413 | −2.586 | −1.53E−01 | 3.49E−01 | −1.61E−01 | 2.93E−02 |

Table 12 shows the parameters and condition values for conditions (1), (8), (11), (12), (13), (14)-(20) in accordance with the fourth embodiment of the invention. It can be seen from Table 12 that the wide-angle lens assembly 4 of the fourth embodiment satisfies the conditions (1), (8), (11), (12), (13), (14)-(20).

TABLE 12

| R11/Nd2 | 27.09 mm | f3 × (CT1 + CT2) | 2.16 mm² | (R32)²/CT4 | 16.04 mm |
|---|---|---|---|---|---|
| (Vd1/R51)/f3 | 8.27 mm⁻² | (CT1 + CT2)/CT4 | 7.12 | (R62/Nd6)/CT4 | 6.14 |
| (f4/(R52/R32))² | 5.37 mm² | (f6)²/R61 | 2.21 mm | (Vd5/Vd6) − R22 | 4.62 |
| \| R61/R52 \| | 4.79 | \| R11/R41 \| | 1.21 | f1/(R41 + f5) | 0.08 |

In addition, the wide-angle lens assembly 4 of the fourth embodiment can meet the requirements of optical performance as seen in FIGS. 8A-8D. It can be seen from FIG. 8A that the longitudinal aberration in the wide-angle lens assembly 4 of the fourth embodiment ranges from −0.02 mm to 0.03 mm. It can be seen from FIG. 8B that the field curvature of tangential direction and sagittal direction in the wide-angle lens assembly 4 of the fourth embodiment ranges from −0.1 mm to 0.6 mm. It can be seen from FIG. 8C that the distortion in the wide-angle lens assembly 4 of the fourth embodiment ranges from −50% to 0%. It can be seen from FIG. 8D that the relative illumination in the wide-angle lens assembly 4 of the fourth embodiment ranges from 0.42 to 1.0. It is obvious that the longitudinal aberration, the field curvature, and the distortion of the wide-angle lens assembly 4 of the fourth embodiment can be corrected effectively, and the relative illumination of the wide-angle lens assembly 4 of the fourth embodiment can meet the requirement. Therefore, the wide-angle lens assembly 4 of the fourth embodiment is capable of good optical performance.

Referring to FIG. 9, the wide-angle lens assembly 5 includes a first lens L51, a second lens L52, a stop ST5, a third lens L53, a fourth lens L54, a fifth lens L55, a sixth lens L56, and a cover glass CG5, all of which are arranged in order from an object side to an image side along an optical axis OA5. In operation, the light from the object side is imaged on an image plane IMA5.

According to the foregoing, wherein: the fourth lens L54 is a meniscus lens, wherein the object side surface S58 is a convex surface; and both of the object side surface S514 and image side surface S515 of the cover glass CG5 are plane surfaces.

With the above design of the lenses, stop ST5, and at least one of the conditions (8), (11), (12), (13), and (14)-(20) satisfied, the wide-angle lens assembly 5 can have an effective increased field of view, an effective increased resolution, an effective corrected aberration, and an effective corrected chromatic aberration.

Table 13 shows the optical specification of the wide-angle lens assembly 5 in FIG. 9.

TABLE 13

Effective Focal Length = 1.29 mm F-number = 1.60
Total Lens Length = 6.56 mm Field of View = 115.40 degrees

| Surface Number | Radius of Curvature (mm) | Thickness (mm) | Nd | Vd | Effective Focal Length (mm) | Remark |
|---|---|---|---|---|---|---|
| S51 | 50.00 | 0.58 | 1.5445 | 56.003 | −2.13 | L51 |
| S52 | 1.14 | 1.09 | | | | |
| S53 | −10.18 | 1.08 | 1.6613 | 20.373 | 10.14 | L52 |
| S54 | −4.24 | 0.22 | | | | |

TABLE 13-continued

Effective Focal Length = 1.29 mm F-number = 1.60
Total Lens Length = 6.56 mm Field of View = 115.40 degrees

| Surface Number | Radius of Curvature (mm) | Thickness (mm) | Nd | Vd | Effective Focal Length (mm) | Remark |
|---|---|---|---|---|---|---|
| S55 | ∞ | −0.09 | | | | ST5 |
| S56 | 2.00 | 0.64 | 1.5445 | 56.003 | 2.03 | L53 |
| S57 | −2.20 | 0.06 | | | | |
| S58 | 1.35 | 0.22 | 1.6613 | 20.373 | −2.57 | L54 |
| S59 | 0.71 | 0.15 | | | | |
| S510 | 5.22 | 0.71 | 1.69 | 52.75 | 1.61 | L55 |
| S511 | −1.34 | 0.02 | | | | |
| S512 | 4.65 | 0.27 | 1.6613 | 20.373 | −4.29 | L56 |
| S513 | 1.73 | 0.90 | | | | |
| S514 | ∞ | 0.21 | 1.5233 | 54.517 | | CG5 |
| S515 | ∞ | 0.50 | | | | |

The definition of aspheric surface sag z of each aspheric lens in Table 13 is the same as that of in Table 1, and is not described here again.

In the fifth embodiment, the conic constant k and the aspheric coefficients A, B, C, D of each aspheric lens are shown in Table 14.

TABLE 14

| Surface Number | k | A | B | C | D |
|---|---|---|---|---|---|
| S52 | −1.004 | 7.05E−02 | 2.49E−02 | 2.60E−03 | 0 |
| S53 | −58.091 | −5.79E−02 | −2.39E−02 | 2.29E−02 | 0 |
| S54 | 4.172 | −7.65E−02 | 3.04E−02 | 1.71E−02 | 0 |
| S56 | −1.605 | 6.48E−02 | −1.13E−01 | 8.22E−02 | 0 |
| S57 | 0 | 2.18E−01 | −3.64E−01 | 3.06E−01 | −9.06E−02 |
| S58 | 0 | −1.058 | 9.72E−01 | −3.42E−01 | −6.18E−02 |
| S59 | −3.290 | −5.10E−01 | 7.09E−01 | −3.60E−01 | 1.87E−02 |
| S510 | 0 | 2.28E−01 | −2.00E−01 | 1.23E−01 | −3.54E−02 |
| S511 | −11.316 | −5.63E−02 | 2.77E−01 | −3.48E−01 | 1.58E−01 |
| S512 | 0 | 2.99E−02 | −1.47E−02 | −7.41E−02 | 1.79E−02 |
| S513 | −20.409 | 6.57E−02 | 8.55E−02 | −6.99E−02 | 1.42E−02 |

Table 15 shows the parameters and condition values for conditions (8), (11), (12), (13), (14)-(20) in accordance with the fifth embodiment of the invention. It can be seen from Table 15 that the wide-angle lens assembly 5 of the fifth embodiment satisfies the conditions (8), (11), (12), (13), (14)-(20).

TABLE 15

| | | | |
|---|---|---|---|
| R11/Nd2 | 30.10 mm | f3 × (CT1 + CT2) | 3.38 mm² |
| (Vd1/R51)/f3 | 5.28 mm⁻² | (CT1 + CT2)/CT4 | 7.56 |
| (f4/(R52/R32))² | 17.81 mm² | (f6)²/R61 | 3.95 mm |
| │R61/R52│ | 3.48 | f1/(R41 + f5) | −0.72 |
| (R32)²/CT4 | 21.98 mm | | |
| (R62/Nd6)/CT4 | 4.74 | | |
| (Vd5/Vd6) − R22 | 6.83 | | |

In addition, the wide-angle lens assembly 5 of the fifth embodiment can meet the requirements of optical performance as seen in FIGS. 10A-10D. It can be seen from FIG. 10A that the longitudinal aberration in the wide-angle lens assembly 5 of the fifth embodiment ranges from −0.004 mm to 0.012 mm. It can be seen from FIG. 10B that the field curvature of tangential direction and sagittal direction in the wide-angle lens assembly 5 of the fifth embodiment ranges from −0.06 mm to 0.06 mm. It can be seen from FIG. 10C that the distortion in the wide-angle lens assembly 5 of the fifth embodiment ranges from −40% to 0%. It can be seen from FIG. 10D that the relative illumination in the wide-angle lens assembly 5 of the fifth embodiment ranges from 0.42 to 1.0. It is obvious that the longitudinal aberration, the field curvature, and the distortion of the wide-angle lens assembly 5 of the fifth embodiment can be corrected effectively, and the relative illumination of the wide-angle lens assembly 5 of the fifth embodiment can meet the requirement. Therefore, the wide-angle lens assembly 5 of the fifth embodiment is capable of good optical performance.

Referring to FIG. 11, the wide-angle lens assembly 6 includes a first lens L61, a second lens L62, a stop ST6, a third lens L63, a fourth lens L64, a fifth lens L65, a sixth lens L66, and a cover glass CG6, all of which are arranged in order from an object side to an image side along an optical axis OA6. In operation, the light from the object side is imaged on an image plane IMA6.

According to the foregoing, wherein: the fourth lens L64 is a meniscus lens, wherein the object side surface S68 is a convex surface; and both of the object side surface S614 and image side surface S615 of the cover glass CG6 are plane surfaces.

With the above design of the lenses, stop ST6, and at least one of the conditions (8), (11), (12), (13), and (14)-(20) satisfied, the wide-angle lens assembly 6 can have an effective increased field of view, an effective increased resolution, an effective corrected aberration, and an effective corrected chromatic aberration.

Table 16 shows the optical specification of the wide-angle lens assembly 6 in FIG. 11.

TABLE 16

Effective Focal Length = 1.33 mm F-number = 1.60
Total Lens Length = 6.17 mm Field of View = 115.30 degrees

| Surface Number | Radius of Curvature (mm) | Thickness (mm) | Nd | Vd | Effective Focal Length (mm) | Remark |
|---|---|---|---|---|---|---|
| S61 | 82.43 | 0.53 | 1.5445 | 56.003 | −2.23 | L61 |
| S62 | 1.20 | 1.09 | | | | |
| S63 | −38.22 | 0.80 | 1.6613 | 20.373 | 17.7 | L62 |
| S64 | −9.11 | 0.23 | | | | |

TABLE 16-continued

Effective Focal Length = 1.33 mm F-number = 1.60
Total Lens Length = 6.17 mm Field of View = 115.30 degrees

| Surface Number | Radius of Curvature (mm) | Thickness (mm) | Nd | Vd | Effective Focal Length (mm) | Remark |
|---|---|---|---|---|---|---|
| S65 | ∞ | −0.12 | | | | ST6 |
| S66 | 2.33 | 0.56 | 1.5445 | 56.003 | 1.99 | L63 |
| S67 | −1.88 | 0.06 | | | | |
| S68 | 1.42 | 0.24 | 1.6613 | 20.373 | −3.13 | L64 |
| S69 | 0.79 | 0.17 | | | | |
| S610 | 4.43 | 0.85 | 1.69 | 52.75 | 1.54 | L65 |
| S611 | −1.30 | 0.04 | | | | |
| S612 | 1.71 | 0.24 | 1.6613 | 20.373 | −3.38 | L66 |
| S613 | 0.92 | 0.85 | | | | |
| S614 | ∞ | 0.21 | 1.5233 | 54.517 | | CG6 |
| S615 | ∞ | 0.44 | | | | |

The definition of aspheric surface sag z of each aspheric lens in Table 16 is the same as that of in Table 1, and is not described here again.

In the sixth embodiment, the conic constant k and the aspheric coefficients A, B, C, D of each aspheric lens are shown in Table 17.

TABLE 17

| Surface Number | k | A | B | C | D |
|---|---|---|---|---|---|
| S62 | −0.918 | 6.35E−02 | 1.69E−02 | 8.81E−03 | 0 |
| S63 | 1190.546 | −6.46E−02 | −4.35E−02 | 4.80E−02 | 0 |
| S64 | 9.105 | −7.65E−02 | −5.69E−02 | 1.19E−01 | 0 |
| S66 | 0.120 | 6.91E−02 | −2.62E−01 | 1.67E−01 | 0 |
| S67 | −5.042 | 9.73E−02 | −2.90E−01 | 1.41E−01 | 2.20E−02 |
| S68 | 0.909 | −7.39E−01 | 3.57E−01 | 1.17E−01 | −2.23E−01 |
| S69 | −0.593 | −9.09E−01 | 7.82E−01 | −3.08E−01 | −1.86E−02 |
| S610 | 15.233 | 1.85E−01 | −4.01E−01 | 4.71E−01 | −2.01E−01 |
| S611 | −11.202 | −1.52E−01 | 2.82E−01 | −2.77E−01 | 1.34E−01 |
| S612 | 0 | −3.88E−01 | 3.46E−01 | −2.87E−01 | 1.04E−01 |
| S613 | −6.170 | −7.28E−02 | 1.27E−01 | −9.51E−02 | 3.65E−02 |

Table 18 shows the parameters and condition values for conditions (8), (11), (12), (13), (14)-(20) in accordance with the sixth embodiment of the invention. It can be seen from Table 18 that the wide-angle lens assembly 6 of the sixth embodiment satisfies the conditions (8), (11), (12), (13), (14)-(20).

TABLE 18

| | | | |
|---|---|---|---|
| R11/Nd2 | 49.62 mm | f3 × (CT1 + CT2) | 2.64 mm² | (R32)²/CT4 | 14.47 mm |
| (Vd1/R51)/f3 | 6.35 mm⁻² | (CT1 + CT2)/CT4 | 5.45 | (R62/Nd6)/CT4 | 2.28 |
| (f4/(R52/R32))² | 20.35 mm² | (f6)²/R61 | 6.68 mm | (Vd5/Vd6) − R22 | 11.70 |
| \| R61/R52 \| | 1.31 | f1/(R41 + f5) | −0.75 | | |

In addition, the wide-angle lens assembly 6 of the sixth embodiment can meet the requirements of optical performance as seen in FIGS. 12A-12D. It can be seen from FIG. 12A that the longitudinal aberration in the wide-angle lens assembly 6 of the sixth embodiment ranges from −0.01 mm to 0.03 mm. It can be seen from FIG. 12B that the field curvature of tangential direction and sagittal direction in the wide-angle lens assembly 6 of the sixth embodiment ranges from −0.03 mm to 0.04 mm. It can be seen from FIG. 12C that the distortion in the wide-angle lens assembly 6 of the sixth embodiment ranges from −40% to 0%. It can be seen from FIG. 12D that the relative illumination in the wide-angle lens assembly 6 of the sixth embodiment ranges from 0.44 to 1.0. It is obvious that the longitudinal aberration, the field curvature, and the distortion of the wide-angle lens assembly 6 of the sixth embodiment can be corrected effectively, and the relative illumination of the wide-angle lens assembly 6 of the sixth embodiment can meet the requirement. Therefore, the wide-angle lens assembly 6 of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
    a first lens which is with negative refractive power;
    a second lens which is a meniscus lens with positive refractive power and comprises a concave surface facing an object side and a convex surface facing an image side;
    a third lens which is with positive refractive power;
    a fourth lens which is with negative refractive power;
    a fifth lens which is with positive refractive power and comprises a convex surface facing the image side; and
    a sixth lens which is a meniscus lens with refractive power;
    wherein the first lens, the second lens, the third lens, the fourth lens, the fifth lens, and the sixth lens are arranged in order from the object side to the image side along an optical axis;
    wherein an air gap is disposed between the fourth lens and the fifth lens;
    wherein the wide-angle lens assembly satisfies:

$5.2 \leq (CT1+CT2)/CT4 \leq 7.7$;

$1 \leq |R61/R52| \leq 5$;

wherein CT1 is an interval from an object side surface of the first lens to an image side surface of the first lens along the optical axis, CT2 is an interval from an object side surface of the second lens to an image side surface of the second lens along the optical axis, CT4 is an interval from an object side surface of the fourth lens to an image side surface of the fourth lens along the optical axis, R61 is a radius of curvature of an object side surface of the sixth lens, and R52 is a radius of curvature of an image side surface of the fifth lens;

wherein the sixth lens is with negative refractive power and comprises a convex surface facing the object side and a concave surface facing the image side.

2. The wide-angle lens assembly as claimed in claim 1, wherein:
the first lens is a meniscus lens and comprises a convex surface facing the object side and a concave surface facing the image side;
the third lens is a biconvex lens and comprises a convex surface facing the object side and another convex surface facing the image side;
the fourth lens comprises a concave surface facing the image side; and
the fifth lens is a biconvex lens and further comprises a convex surface facing the object side.

3. The wide-angle lens assembly as claimed in claim 2, wherein the fourth lens is a biconcave lens and further comprises another concave surface facing the object side.

4. The wide-angle lens assembly as claimed in claim 3, wherein the wide-angle lens assembly satisfies at least one of following conditions:

$0.6 < |R11/R41| < 2.4$;

$4 < R21/(R12+R22) < 13.5$;

$9.9 < R42/CT4 < 103$;

$1.3 < R51/(f2-CT5) < 3.5$;

$4 \text{ mm} < f2/(CT2-CT6) < 8.2 \text{ mm}$;

$5 \text{ mm} < |R61/Nd1| < 15 \text{ mm}$;

$11 \text{ mm} < |R41-f2| < 25 \text{ mm}$;

$-13 < (R42+R41)/R32 < 0.3$;

$3.3 \text{ mm} < R42/(Vd3/Vd4) < 30 \text{ mm}$;

$-3.2 < f1/(R41+f5) < 2.3$;

$4 \le (Vd5/Vd6)-R22 \le 12$;

wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

5. The wide-angle lens assembly as claimed in claim 2, wherein the wide-angle lens assembly satisfies at least one of following conditions:

$0.6 < |R11/R41| < 2.4$;

$4 < R21/(R12+R22) < 13.5$;

$9.9 < R42/CT4 < 103$;

$1.3 < R51/(f2-CT5) < 3.5$;

$4 \text{ mm} < f2/(CT2-CT6) < 8.2 \text{ mm}$;

$5 \text{ mm} < |R61/Nd1| < 15 \text{ mm}$;

$11 \text{ mm} < |R41-f2| < 25 \text{ mm}$;

$-13 < (R42+R41)/R32 < 0.3$;

$3.3 \text{ mm} < R42/(Vd3/Vd4) < 30 \text{ mm}$;

$-3.2 < f1/(R41+f5) < 2.3$;

$4 \le (Vd5/Vd6)-R22 \le 12$;

wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

6. The wide-angle lens assembly as claimed in claim 2, wherein the fourth lens is a meniscus lens and further comprises a convex surface facing the object side.

7. The wide-angle lens assembly as claimed in claim 6, wherein the wide-angle lens assembly satisfies at least one of following conditions:

$$25 \text{ mm} \leq R11/Nd2 \leq 50 \text{ mm};$$

$$1.5 \text{ mm}^2 \leq f3 \times (CT1+CT2) \leq 3.5 \text{ mm}^2;$$

$$13 \text{ mm} \leq (R32)^2/CT4 \leq 23 \text{ mm};$$

$$5 \text{ mm}^{-2} \leq (Vd1/R51)/f3 \leq 8.5 \text{ mm}^{-2};$$

$$2 \leq (R62/Nd6)/CT4 \leq 6.5;$$

$$5 \text{ mm}^2 \leq (f4/(R52/R32))^2 \leq 21 \text{ mm}^2;$$

$$2 \text{ mm} \leq (f6)^2/R61 \leq 7 \text{ mm};$$

$$-3.2 < f1/(R41+f5) < 2.3;$$

$$4 \leq (Vd5/Vd6) - R22 \leq 12;$$

wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

8. The wide-angle lens assembly as claimed in claim 2, wherein the wide-angle lens assembly satisfies at least one of following conditions:

$$25 \text{ mm} \leq R11/Nd2 \leq 50 \text{ mm};$$

$$1.5 \text{ mm}^2 \leq f3 \times (CT1+CT2) \leq 3.5 \text{ mm}^2;$$

$$13 \text{ mm} \leq (R32)^2/CT4 \leq 23 \text{ mm};$$

$$5 \text{ mm}^{-2} \leq (Vd1/R51)/f3 \leq 8.5 \text{ mm}^{-2};$$

$$2 \leq (R62/Nd6)/CT4 \leq 6.5;$$

$$5 \text{ mm}^2 \leq (f4/(R52/R32))^2 \leq 21 \text{ mm}^2;$$

$$2 \text{ mm} \leq (f6)^2/R61 \leq 7 \text{ mm};$$

$$-3.2 < f1/(R41+f5) < 2.3;$$

$$4 \leq (Vd5/Vd6) - R22 \leq 12;$$

wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

9. The wide-angle lens assembly as claimed in claim 1, further comprising a stop disposed between the second lens and the third lens.

10. The wide-angle lens assembly as claimed in claim 9, wherein the fourth lens comprises a concave surface facing the object side, the wide-angle lens assembly satisfies at least one of following conditions:

$$0.6 < |R11/R41| < 2.4;$$

$$4 < R21/(R12+R22) < 13.5;$$

$$9.9 < R42/CT4 < 103;$$

$$1.3 < R51/(f2-CT5) < 3.5;$$

$$4 \text{ mm} < f2/(CT2-CT6) < 8.2 \text{ mm};$$

$$5 \text{ mm} < |R61/Nd1| < 15 \text{ mm};$$

$$11 \text{ mm} < |R41-f2| < 25 \text{ mm};$$

$$-13 < (R42+R41)/R32 < 0.3;$$

$$3.3 \text{ mm} < R42/(Vd3/Vd4) < 30 \text{ mm};$$

$$-3.2 < f1/(R41+f5) < 2.3;$$

$$4 \leq (Vd5/Vd6) - R22 \leq 12;$$

wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

11. The wide-angle lens assembly as claimed in claim 9, wherein the sixth lens is with negative refractive power, the wide-angle lens assembly satisfies at least one of following conditions:

$25\text{ mm} \le R11/Nd2 \le 50\text{ mm};$ $1.5\text{ mm}^2 \le f3 \times (CT1+CT2) \le 3.5\text{ mm}^2;$ $13\text{ mm} \le (R32)^2/CT4 \le 23\text{ mm};$ $5\text{ mm}^{-2} \le (Vd1/R51)/f3 \le 8.5\text{ mm}^{-2};$ $2 \le (R62/Nd6)/CT4 \le 6.5;$ $5\text{ mm}^2 \le (f4/(R52/R32))^2 \le 21\text{ mm}^2;$ $2\text{ mm} \le (f6)^2/R61 \le 7\text{ mm};$ $-3.2 < f1/(R41+f5) < 2.3;$ $4 \le (Vd5/Vd6) - R22 \le 12;$ wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

12. The wide-angle lens assembly as claimed in claim 11, wherein:

the first lens is a meniscus lens and comprises a convex surface facing the object side and a concave surface facing the image side;

the third lens is a biconvex lens and comprises a convex surface facing the object side and another convex surface facing the image side;

the fourth lens comprises a concave surface facing the image side;

the fifth lens is a biconvex lens and further comprises a convex surface facing the object side; and the sixth lens comprises a convex surface facing the object side and a concave surface facing the image side.

13. The wide-angle lens assembly as claimed in claim 1, wherein the wide-angle lens assembly satisfies at least one of following conditions:

$-3.2 < f1/(R41+f5) < 2.3;$ $4 \le (Vd5/Vd6) - R22 \le 12;$ wherein R22 is a radius of curvature of the image side surface of the second lens, R41 is a radius of curvature of the object side surface of the fourth lens, f1 is an effective focal length of the first lens, f5 is an effective focal length of the fifth lens, Vd5 is an Abbe number of the fifth lens, and Vd6 is an Abbe number of the sixth lens.

14. A wide-angle lens assembly comprising:

a first lens which is with negative refractive power;

a second lens which is with positive refractive power;

a third lens which is with positive refractive power;

a fourth lens which is with negative refractive power;

a fifth lens which is with positive refractive power and comprises a convex surface facing an image side; and a sixth lens which is a meniscus lens with refractive power and comprises a concave surface facing an object side and a convex surface facing the image side;

wherein the first lens, the second lens, the third lens, the fourth lens, the fifth lens, and the sixth lens are arranged in order from the object side to the image side along an optical axis;

wherein an air gap is disposed between the fourth lens and the fifth lens;

wherein the wide-angle lens assembly satisfies:

$5.2 \le (CT1+CT2)/CT4 \le 7.7;$ $1 \le |R61/R52| \le 5;$ wherein CT1 is an interval from an object side surface of the first lens to an image side surface of the first lens along the optical axis, CT2 is an interval from an object side surface of the second lens to an image side surface of the second lens along the optical axis, CT4 is an interval from an object side surface of the fourth lens to an image side surface of the fourth lens along the optical axis, R61 is a radius of curvature of an object side surface of the sixth lens, and R52 is a radius of curvature of an image side surface of the fifth lens;

wherein the fourth lens is a biconcave lens and comprises a concave surface facing the object side.

15. The wide-angle lens assembly as claimed in claim 14, wherein the sixth lens is with positive refractive power, the wide-angle lens assembly satisfies at least one of following conditions:

$0.6 < |R11/R41| < 2.4;$ $4 < R21/(R12+R22) < 13.5;$ $9.9 < R42/CT4 < 103;$ $1.3 < R51/(f2-CT5) < 3.5;$ $4 \text{ mm} < f2/(CT2-CT6) < 8.2 \text{ mm};$ $5 \text{ mm} < |R61/Nd1| < 15 \text{ mm};$ $11 \text{ mm} < |R41-f2| < 25 \text{ mm};$ $-13 < (R42+R41)/R32 < 0.3;$ $3.3 \text{ mm} < R42/(Vd3/Vd4) < 30 \text{ mm};$ $-3.2 < f1/(R41+f5) < 2.3;$ $4 \leq (Vd5/Vd6)-R22 \leq 12;$ wherein R11 is a radius of curvature of the object side surface of the first lens, R12 is a radius of curvature of the image side surface of the first lens, R21 is a radius of curvature of the object side surface of the second lens, R22 is a radius of curvature of the image side surface of the second lens, R32 is a radius of curvature of an image side surface of the third lens, R41 is a radius of curvature of the object side surface of the fourth lens, R42 is a radius of curvature of the image side surface of the fourth lens, R51 is a radius of curvature of an object side surface of the fifth lens, R61 is the radius of curvature of the object side surface of the sixth lens, CT2 is the interval from the object side surface of the second lens to the image side surface of the second lens along the optical axis, CT4 is the interval from the object side surface of the fourth lens to the image side surface of the fourth lens along the optical axis, CT5 is an interval from the object side surface of the fifth lens to the image side surface of the fifth lens along the optical axis, CT6 is an interval from the object side surface of the sixth lens to an image side surface of the sixth lens along the optical axis, f1 is an effective focal length of the first lens, f2 is an effective focal length of the second lens, f5 is an effective focal length of the fifth lens, Nd1 is an index of refraction of the first lens, Vd3 is an Abbe number of the third lens, Vd4 is an Abbe number of the fourth lens, Vd5 is an Abbe number of the fifth lens, and Vd6 is an Abbe number of the sixth lens.

16. The wide-angle lens assembly as claimed in claim 15, wherein:
   the first lens is a meniscus lens and comprises a convex surface facing the object side and a concave surface facing the image side;
   the second lens is a meniscus lens and comprises a concave surface facing the object side and a convex surface facing the image side;
   the third lens is a biconvex lens and comprises a convex surface facing the object side and another convex surface facing the image side;
   the fourth lens comprises a concave surface facing the image side; and
   the fifth lens is a biconvex lens and further comprises a convex surface facing the object side.

17. A wide-angle lens assembly comprising:
   a first lens which is with negative refractive power;
   a second lens which is with positive refractive power;
   a third lens which is with positive refractive power;
   a fourth lens which is a meniscus lens with negative refractive power and comprises a convex surface facing an object side and a concave surface facing an image side;
   a fifth lens which is with positive refractive power and comprises a convex surface facing the image side; and
   a sixth lens which is with refractive power;
   wherein the first lens, the second lens, the third lens, the fourth lens, the fifth lens, and the sixth lens are arranged in order from the object side to the image side along an optical axis;
   wherein an air gap is disposed between the fourth lens and the fifth lens;
   wherein the wide-angle lens assembly satisfies:

$5.2 \leq (CT1+CT2)/CT4 \leq 7.7;$ $1 \leq |R61/R52| \leq 5;$ wherein CT1 is an interval from an object side surface of the first lens to an image side surface of the first lens along the optical axis, CT2 is an interval from an object side surface of the second lens to an image side surface of the second lens along the optical axis, CT4 is an interval from an object side surface of the fourth lens to an image side surface of the fourth lens along the optical axis, R61 is a radius of curvature of an object side surface of the sixth lens, and R52 is a radius of curvature of an image side surface of the fifth lens;
   wherein the first lens is a meniscus lens and comprises a convex surface facing the object side and a concave surface facing the image side;
   wherein the third lens is a biconvex lens and comprises a convex surface facing the object side and another convex surface facing the image side;
   wherein the fifth lens is a biconvex lens and further comprises a convex surface facing the object side;
   wherein the sixth lens comprises a convex surface facing the object side and a concave surface facing the image side.

18. The wide-angle lens assembly as claimed in claim 17, wherein the wide-angle lens assembly satisfies at least one of following conditions:

$25 \text{ mm} \leq R11/Nd2 \leq 50 \text{ mm};$ $1.5 \text{ mm}^2 \leq f3 \times (CT1+CT2) \leq 3.5 \text{ mm}^2;$ $13 \text{ mm} \leq (R32)^2/CT4 \leq 23 \text{ mm};$ $5 \text{ mm}^{-2} \leq (Vd1/R51)/f3 \leq 8.5 \text{ mm}^{-2};$ $2 \leq (R62/Nd6)/CT4 \leq 6.5;$ $5 \text{ mm}^2 \leq (f4/(R52/R32))^2 \leq 21 \text{ mm}^2;$ $2 \text{ mm} \leq (f6)^2/R61 \leq 7 \text{ mm};$ $-3.2 < f1/(R41+f5) < 2.3;$ $4 \leq (Vd5/Vd6)-R22 \leq 12;$ wherein R11 is a radius of curvature of the object side surface of the first lens, R22 is a radius of curvature of the image side surface of the second lens, R32 is a radius of curvature of an image side surface of the third lens, R41 is a radius of curvature of the object side surface of the fourth lens, R51 is a radius of curvature of an object side surface of the fifth lens, R52 is the radius of curvature of the image side surface of the fifth lens, R61 is the radius of curvature of the object side surface of the sixth lens, R62 is a radius of curvature of an image side surface of the sixth lens, CT1 is the interval from the object side surface of the first lens to the image side surface of the first lens along the optical axis, CT2 is the interval from the object side surface of the second lens to the image side surface of the second lens along the optical axis, CT4 is the interval from the object side surface of the fourth lens to the image side surface of the fourth lens along the optical axis, f1 is an effective focal length of the first lens, f3 is an effective focal length of the third lens, f4 is an effective focal length of the fourth lens, f5 is an effective focal length of the fifth lens, f6 is an effective focal length of the sixth lens, Nd2 is an index of refraction of the second lens, Nd6 is an index of refraction of the sixth lens, Vd1 is an Abbe number of the first lens, Vd5 is an Abbe number of the fifth lens, and Vd6 is an Abbe number of the sixth lens.

* * * * *